US012569966B2

(12) United States Patent
Leathrum

(10) Patent No.: US 12,569,966 B2
(45) Date of Patent: Mar. 10, 2026

(54) POWERED FASTENER DRIVER

(71) Applicant: MILWAUKEE ELECTRIC TOOL CORPORATION, Brookfield, WI (US)

(72) Inventor: Travis W. Leathrum, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 21 days.

(21) Appl. No.: 18/809,485

(22) Filed: Aug. 20, 2024

(65) Prior Publication Data

US 2025/0065481 A1 Feb. 27, 2025

Related U.S. Application Data

(60) Provisional application No. 63/520,672, filed on Aug. 21, 2023.

(51) Int. Cl.
*B25C 1/00* (2006.01)

(52) U.S. Cl.
CPC .............. *B25C 1/008* (2013.01); *B25C 1/001* (2013.01)

(58) Field of Classification Search
USPC .............................................................. 227/8
See application file for complete search history.

(56) References Cited

U.S. PATENT DOCUMENTS 3,524,576 A 8/1970 Bader
3,858,780 A 1/1975 Perkins et al.
5,683,024 A 11/1997 Eminger et al.
5,772,098 A 6/1998 Crutcher
6,913,179 B1 7/2005 Chen
6,966,476 B2 11/2005 Jalbert et al.
6,966,477 B1 11/2005 Chien-kuo et al.
7,086,573 B1 8/2006 Wen
7,134,586 B2 11/2006 Mcgee et al.
7,137,186 B2 11/2006 Wojcicki et al.
7,455,207 B2 11/2008 Wojcicki et al.
(Continued)

FOREIGN PATENT DOCUMENTS

EP 2669057 B1 * 6/2019 ............. B25C 1/008
EP 4357082 A1 * 4/2024 ............... B25C 7/00
(Continued)

*Primary Examiner* — Praachi M Pathak
(74) *Attorney, Agent, or Firm* — Michael Best & Friedrich LLP

(57) ABSTRACT

A powered fastener driver includes a housing, a nosepiece extending from the housing, a workpiece contact bracket, a driver blade, and a dry-fire lockout lever. The dry-fire lockout lever is movable between a first bypass position in which movement of the workpiece contact bracket is not obstructed and in which the dry-fire lockout lever is engaged with a first fastener adjacent the fastener driving channel, a second bypass position in which movement of the workpiece contact bracket is not obstructed and in which the dry-fire lockout lever is engaged with a second fastener within the fastener driving channel, and a lockout position in which movement of the workpiece contact bracket is obstructed. The dry-fire lockout lever is entirely removed from the fastener driving channel when in the first bypass position. The dry-fire lockout lever is at least partially positioned within the fastener driving channel when in the second bypass position.

20 Claims, 22 Drawing Sheets

(56) References Cited

U.S. PATENT DOCUMENTS

| | | | | |
|---|---|---|---|---|
| 7,699,201 | B2 | 4/2010 | Hagan et al. | |
| 7,866,521 | B2 | 1/2011 | Gross et al. | |
| 7,896,212 | B2 | 3/2011 | Uejima et al. | |
| 7,922,054 | B2 | 4/2011 | Cole, Jr. | |
| 7,950,556 | B2 | 5/2011 | Hagan | |
| 8,051,919 | B2 | 11/2011 | Hagan et al. | |
| 8,052,021 | B2 | 11/2011 | Wu | |
| 8,104,658 | B2 | 1/2012 | Yu | |
| 8,336,748 | B2 | 12/2012 | Hlinka et al. | |
| 8,746,526 | B2 | 6/2014 | Hlinka et al. | |
| 8,777,079 | B2 | 7/2014 | Po et al. | |
| 9,636,811 | B2 | 5/2017 | Segura | |
| 11,034,005 | B2 * | 6/2021 | Suarez | B25C 1/005 |
| 11,224,960 | B2 | 1/2022 | Garces et al. | |
| 2008/0164295 | A1 | 7/2008 | Wu et al. | |
| 2011/0062207 | A1 * | 3/2011 | Hlinka | B25C 1/008 227/8 |
| 2013/0320060 | A1 * | 12/2013 | Gregory | B25C 1/005 227/8 |
| 2016/0368126 | A1 | 12/2016 | Liu et al. | |
| 2021/0347022 | A1 | 11/2021 | Leathrum et al. | |
| 2021/0362311 | A1 | 11/2021 | Garces et al. | |
| 2023/0264332 | A1 | 8/2023 | Neuhoff et al. | |
| 2025/0073875 | A1 * | 3/2025 | Garces | B25C 1/003 |

FOREIGN PATENT DOCUMENTS

| | | | | | |
|---|---|---|---|---|---|
| WO | WO-2018005632 | A1 * | 1/2018 | | B25C 1/06 |
| WO | WO-2023168393 | A1 * | 9/2023 | | B25C 1/008 |

* cited by examiner

POWERED FASTENER DRIVER

CROSS-REFERENCE TO RELATED APPLICATIONS

This application claims priority to U.S. Provisional Patent Application No. 63/520,672 filed on Aug. 21, 2023, the entire content of which is incorporated herein by reference.

FIELD OF THE INVENTION

The present invention relates to power tools, and more particularly to powered fastener drivers.

BACKGROUND OF THE INVENTION

Powered fastener drivers are used for driving fasteners (e.g., nails, tacks, staples, etc.) into a workpiece. Such fastener drivers typically include a magazine in which the fasteners are stored and a pusher mechanism for individually transferring fasteners from the magazine to a fastener driving channel, where the fastener is impacted by a driver blade during a fastener driving operation.

SUMMARY OF THE INVENTION

The present invention provides, in one aspect, a powered fastener driver that includes a housing, a nosepiece extending from the housing, a workpiece contact bracket slidably disposed on the nosepiece, a driver blade movable within the nosepiece between a top-dead-center (TDC) position and a bottom-dead-center (BDC) position, a piston coupled to the driver blade for movement therewith, a driver cylinder within which the piston is movable and in fluid communication with a pressurized gas acting on the piston, a magazine coupled to the nosepiece in which collated fasteners are receivable, a fastener delivery mechanism coupled to the nosepiece for individually transferring collated fasteners in the magazine to a fastener driving channel in the nosepiece, a nosepiece access door pivotably disposed on the nosepiece to provide access to the fastener driving channel, and a dry-fire lockout lever pivotably disposed on the nosepiece access door adjacent the fastener driving channel, wherein the dry-fire lockout lever is movable between a first bypass position in which movement of the workpiece contact bracket is not obstructed and in which the dry-fire lockout lever is engaged with a first fastener adjacent the fastener driving channel, a second bypass position in which movement of the workpiece contact bracket is not obstructed and in which the dry-fire lockout lever is engaged with a second fastener within the fastener driving channel, and a lockout position in which movement of the workpiece contact bracket is obstructed, wherein the dry-fire lockout lever is entirely removed from the fastener driving channel when in the first bypass position, and wherein the dry-fire lockout lever is at least partially positioned within the fastener driving channel when in the second bypass position.

The present invention provides, in another aspect, a powered fastener driver that includes a housing, a nosepiece extending from the housing, a workpiece contact bracket slidably disposed on the nosepiece, a driver blade movable within the nosepiece between a top-dead-center (TDC) position and a bottom-dead-center (BDC) position, a piston coupled to the driver blade for movement therewith, a driver cylinder within which the piston is movable and in fluid communication with a pressurized gas acting on the piston, a magazine coupled to the nosepiece in which collated fasteners are receivable, a fastener delivery mechanism coupled to the nosepiece for individually transferring collated fasteners in the magazine to a fastener driving channel in the nosepiece, a nosepiece access door pivotably disposed on the nosepiece to provide access to the fastener driving channel, and a dry-fire lockout lever pivotably disposed on the nosepiece access door adjacent the fastener driving channel, wherein the dry-fire lockout lever includes a first bypass position in which a queued fastener adjacent the fastener driving channel engages the dry-fire lockout lever to prevent the dry-fire lockout lever from entering the fastener driving channel and the driver blade from contacting the dry-fire lockout lever as the driver blade moves toward the BDC position.

The present invention provides, in yet another aspect, a powered fastener driver that includes a housing, a nosepiece extending from the housing, a workpiece contact bracket slidably disposed on the nosepiece, a driver blade movable within the nosepiece between a top-dead-center (TDC) position and a bottom-dead-center (BDC) position, a piston coupled to the driver blade for movement therewith, a driver cylinder within which the piston is movable and in fluid communication with a pressurized gas acting on the piston, a magazine coupled to the nosepiece in which collated fasteners are receivable, a fastener delivery mechanism coupled to the nosepiece for individually transferring collated fasteners in the magazine to a fastener driving channel in the nosepiece, a nosepiece access door pivotably disposed on the nosepiece to provide access to the fastener driving channel, and a dry-fire lockout lever pivotably disposed on the nosepiece access door adjacent the fastener driving channel, wherein the workpiece contact bracket engages the dry-fire lockout lever in response to upward movement of the workpiece contact bracket relative to the nosepiece to maintain the dry-fire lockout lever in a first bypass position, in which the dry-fire lockout lever is prevented from entering the fastener driving channel to be contacted by the driver blade as it moves toward the driven position.

Other features and aspects of the invention will become apparent by consideration of the following detailed description and accompanying drawings.

Figure 1:
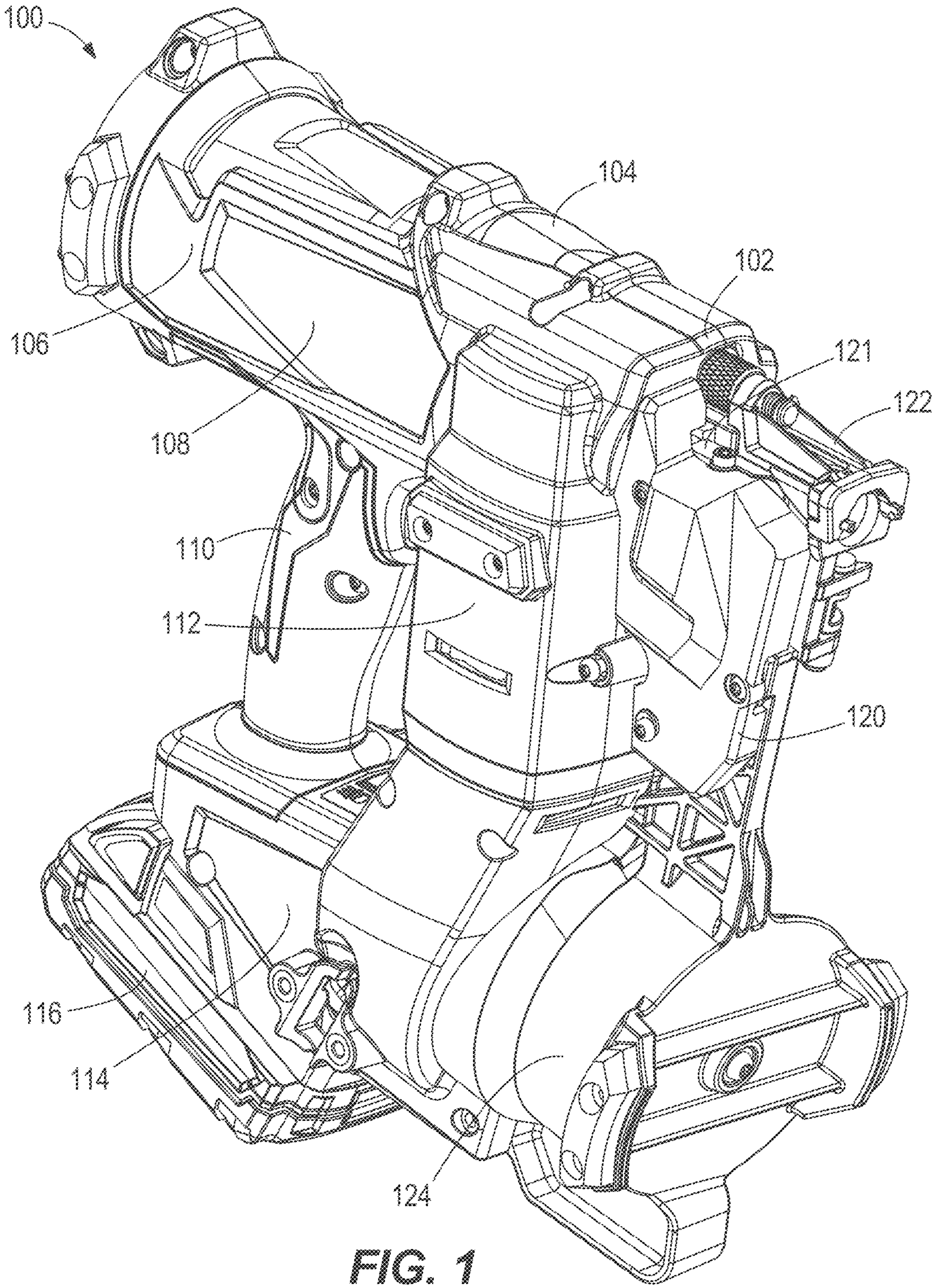
FIG. 1 is a perspective view of a gas-spring powered fastener driver.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

Referring to FIGS. 1-6, an embodiment of a gas spring-powered fastener driver 100 is illustrated. The fastener driver 100 is operable to drive fasteners, such as nails from a collated roll or coil, into a workpiece. The fastener driver 100 includes a housing 102 having a first housing shell 104 joined to a second housing shell 106. The housing 102 includes a head portion 108 having a handle portion 110 and a drive unit housing portion 112 extending therefrom. The housing 102 also includes a battery receptacle portion 114 that extends from the handle portion 110 and is sized and shaped to receive a removable battery pack 116 therein. Further, the housing 102 includes a fastener delivery portion 120 that extends along the drive unit housing portion 112 from a nosepiece 121 to a magazine receptacle portion 124 adjacent the battery receptacle portion 114. A workpiece contact bracket 122 is slidably disposed on the nosepiece 121.

As shown, the magazine receptacle portion 124 is generally cylindrical and is sized and shaped to receive coiled fasteners therein. A magazine cover 126 is rotatably disposed on the housing 102 and provides access to a magazine 128 that may be removably disposed within the magazine receptacle portion 124. The magazine 128 is a canister magazine which contains a coiled strip of collated nails. Individual fasteners are sequentially loaded from the magazine 128 to the nosepiece 121 via the fastener delivery portion 120 during operation of the fastener driver 100.

Figure 2:
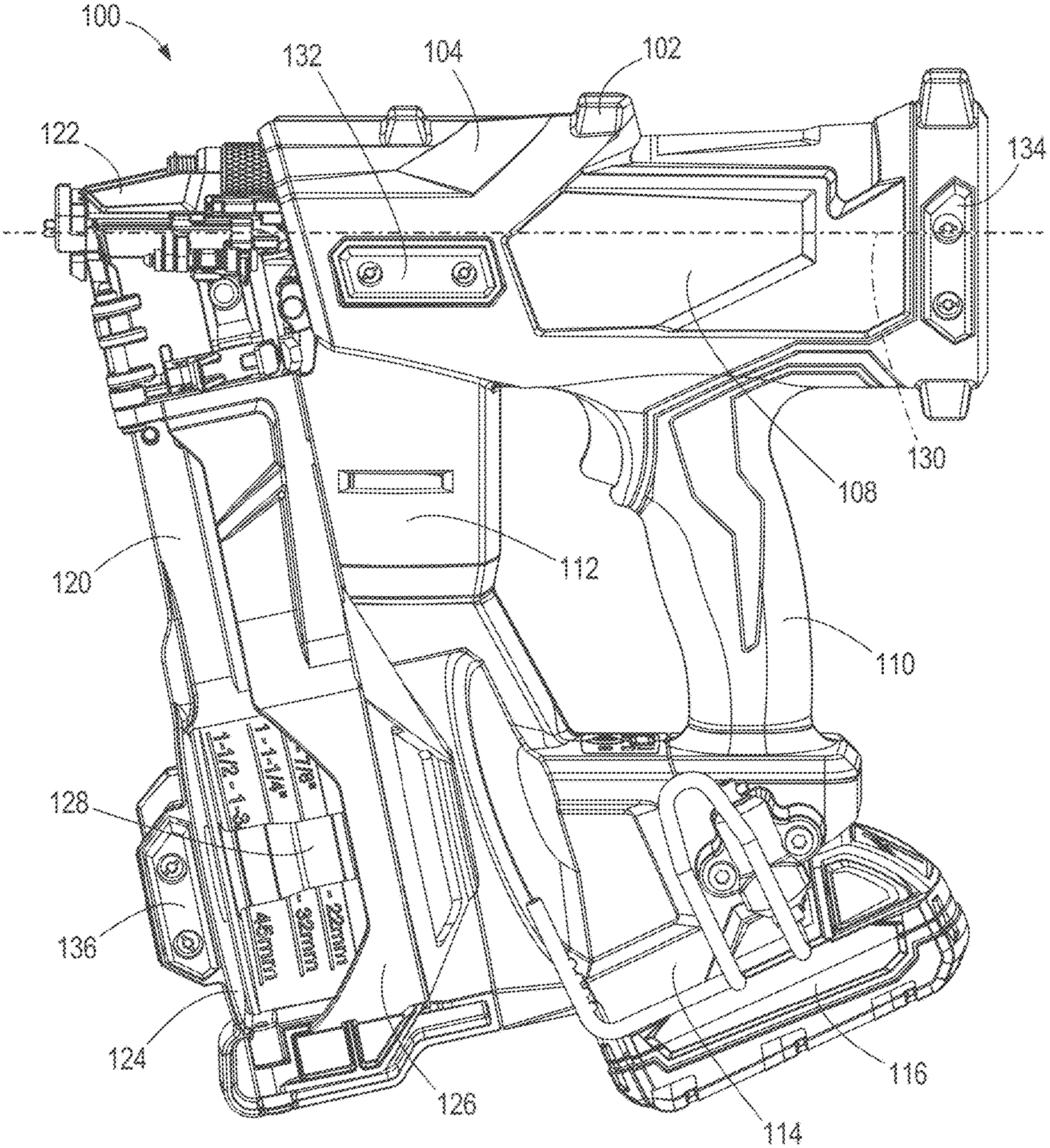
FIG. 2 is a left-side view of the gas-spring powered fastener driver of FIG. 1.

As shown in FIG. 2, the fastener driver 100 defines a driving axis 130 along which fasteners are driven from the fastener driver 100 in a workpiece. Further, as depicted, the fastener driver 100 includes a first sinister wear pad 132 that is disposed on the head portion 108 of the first housing shell 104 near the nosepiece 121. The first sinister wear pad 132 extends in a direction that is parallel to the driving axis 130. The fastener driver 100 further includes a second sinister wear pad 134 that is disposed on the head portion 108 of first housing shell 104 near the end of the head portion 108 opposite the nosepiece 121. The second wear pad 132 extends in a direction that is perpendicular to the driving axis 130. As further shown in FIG. 2, the fastener driver 100 includes a third sinister wear pad 136 that is disposed on the magazine receptacle portion 124 at an angle with respect to the driving axis 130.

Figure 3:
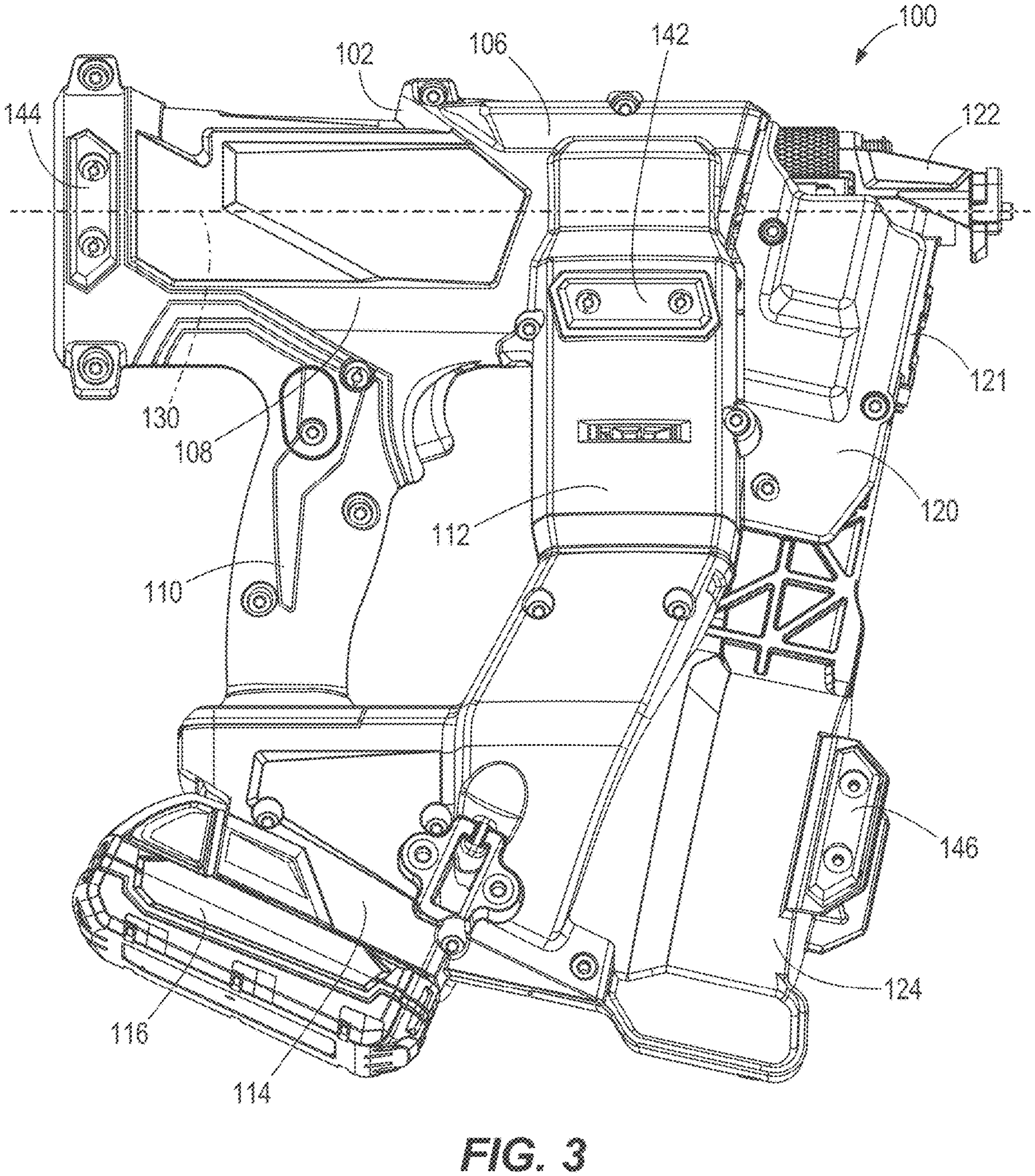
FIG. 3 is a right-side view of the fastener driver of FIG. 1.

FIG. 3 indicates that the fastener driver 100 includes a first dexter wear pad 142 that is disposed on the head portion 108 of the second housing shell 106 near the nosepiece 121. The first dexter wear pad 142 extends in a direction that is parallel to the driving axis 130. The fastener driver 100 further includes a second dexter wear pad 144 that is disposed on the head portion 108 of second housing shell 106 near the end of the head portion 108 opposite the nosepiece 121. The second wear pad 142 extends in a direction that is perpendicular to the driving axis 130. As further shown in FIG. 3, the fastener driver 100 includes a third dexter wear pad 146 that is disposed on the magazine receptacle portion 124 at an angle with respect to the driving axis 130.

Figure 4:
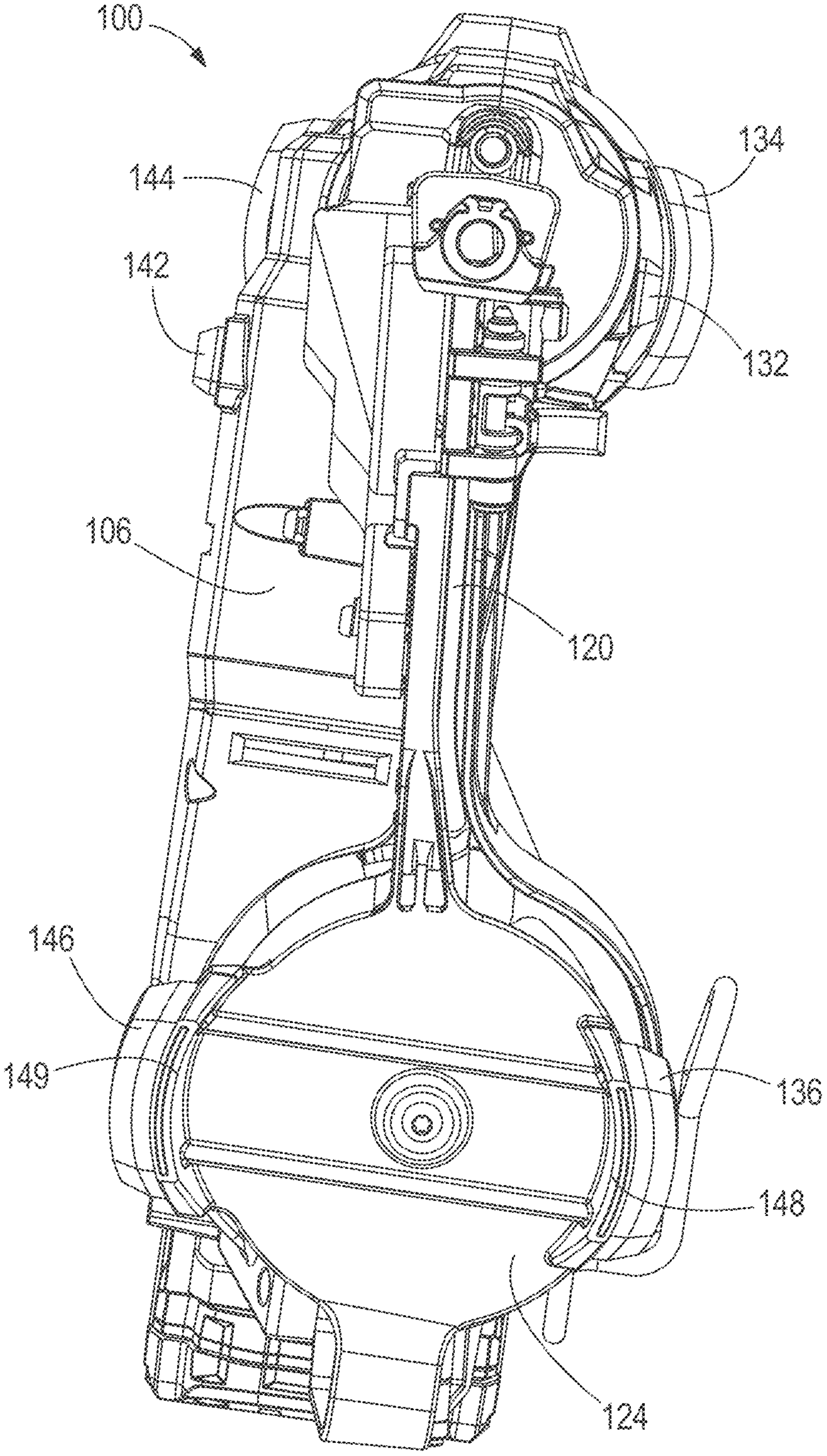
FIG. 4 is a front view of the fastener driver of FIG. 1.
Figure 5:
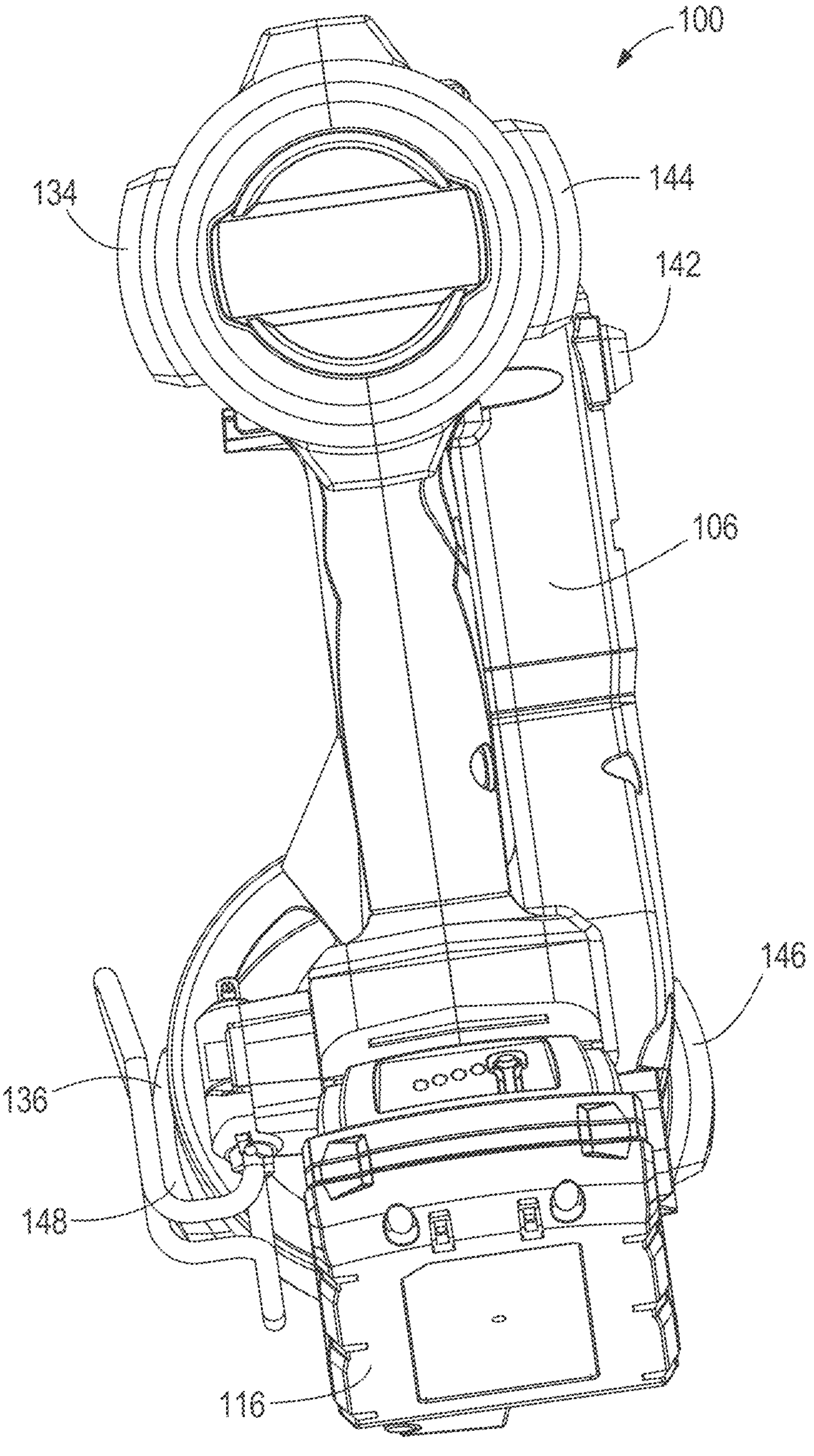
FIG. 5 is a rear view of the fastener driver of FIG. 1.

As shown in FIG. 4, the fastener driver 100 further includes a first abrasion resistant plate 148 adjacent the third sinister wear pad 136 and a second abrasion resistant plate 149 adjacent the third dexter wear pad 146. The abrasion resistant plates 148, 149 are molded into the magazine receptacle portion 124 so that they face in a forward direction, i.e., in the same direction as the nosepiece 121 and the same direction in which a fastener is driven from the fastener driver 100. The abrasion resistant plates 148, 149 are constructed from a material having a relatively high hardness and as such, a relatively high resistance to wear. For example, the abrasion resistant plates 148, 149 are made from a metal such as a high-carbon alloy steel Referring now to FIG. 6, the fastener driver 100 includes a storage chamber cylinder 150 disposed within the head portion 108 of the housing 102. The storage chamber cylinder 150 includes a valve port 152 in which a fill valve is disposed. The fill valve is in fluid communication with the interior of the storage chamber cylinder 150. For example, the fill valve may be configured as a Schrader valve, a Presta valve, a Dunlop valve, or some other similar valve. When connected with a source of compressed gas, the fill valve enables the storage chamber cylinder 150 to be filled with compressed gas or refilled with compressed gas if any leakage occurs.

The storage chamber cylinder 150 includes a driver cylinder 160 disposed therein. Further, a moveable piston 162 is slidably disposed within the driver cylinder 160. A driver blade 164 is connected to the moveable piston 162. As shown, the driver blade 164 includes a proximal end 166 and a distal end 168. The proximal end 166 of the driver blade 164 is connected to the moveable piston 162 via a pin 170. The distal end 168 of the driver blade 164 is located adjacent the nosepiece 121 when the piston 162 is moved to a top-dead-center (TDC) (i.e., retracted or ready) position within the driver cylinder 160 and the fastener driver 100 is ready to be fired. Upon firing, the distal end 168 of the driver blade 164 is moved into the nosepiece 121 to drive a fastener from within the nosepiece 121 and into a workpiece until the piston 162 reaches a bottom-dead-center (BDC) (i.e., extended or driven) position within the driver cylinder 160.

Figure 6:
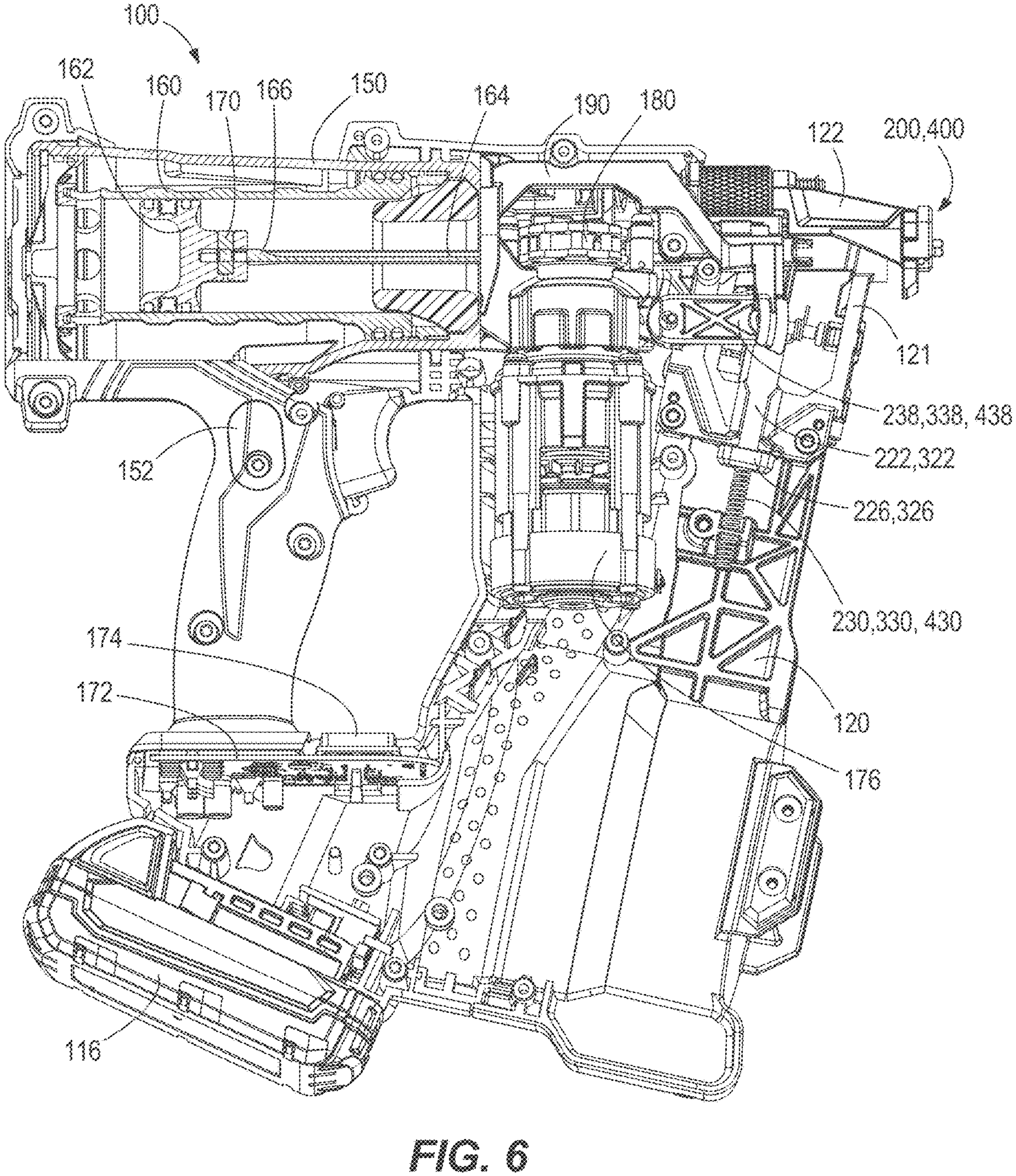
FIG. 6 is a right-side view of the fastener driver of FIG. 1 with a portion of the housing removed and with a partial cross-section through a storage chamber cylinder.

FIG. 6 further indicate that the fastener driver 100 includes a circuit board 172 that controls the operation of the fastener driver 100. A user interface 174 is disposed on the circuit board 172 and extends through the housing 102 into an area near the handle portion 110. The user interface 174 provides the user controls for the fastener driver 100 and includes, for example, an on/off switch, a mode selector button, a remaining charge indicator, a charging indicator, and other additional buttons and indicators, as necessary. The circuit board 172 is electrically connected to the battery receptacle portion 114 and the battery pack 116 when engaged therewith and provides DC power to a motor 176 (e.g., a brushless direct current (BLDC) motor) that is operably coupled to a lifting mechanism 180. The lifting mechanism 180 selectively engages the driver blade 164 and the lifting mechanism 180 is driven by the motor 176 to move the driver blade 164 from a fired position to a ready position and in the process move the piston 162 from the BDC position to the TDC position. Moreover, as described in greater detail below, a latch actuator assembly 190 cooperates with the lifting mechanism 180 to selectively engage the driver blade 164 and hold the driver blade 164 in a ready position before the latch actuator assembly 190 is actuated by the lifting mechanism 180 to release the driver blade 164 into the nosepiece 121 to drive a fastener from the fastener driver 100 and into a workpiece.

FIGS. 7-10 depict a nosepiece assembly 200 that includes the nosepiece 121 and the workpiece contact bracket 122 mounted thereon. The driver blade 164 extends into a fastener driving channel 206 formed in the nosepiece 121. As shown, the nosepiece assembly 200 of the fastener driver 100 includes a depth adjuster 210 having a threaded shaft 212 that is threadably engaged with the workpiece contact bracket 122. The depth adjuster 210 is rotatable to change a linear position of the workpiece contact bracket 122 relative to the nosepiece 121. This changes the depth to which a fastener expelled from the fastener driver 100 is driven into a workpiece. A workpiece contact bracket lock 214 is mounted on the workpiece contact bracket 122 and supports the depth adjuster 210 and allows the depth adjuster 210 to rotate therein. A spring 216 is installed adjacent the workpiece contact bracket lock 214 to bias the workpiece contact bracket 122 forward on the nosepiece 121.

Figure 8:
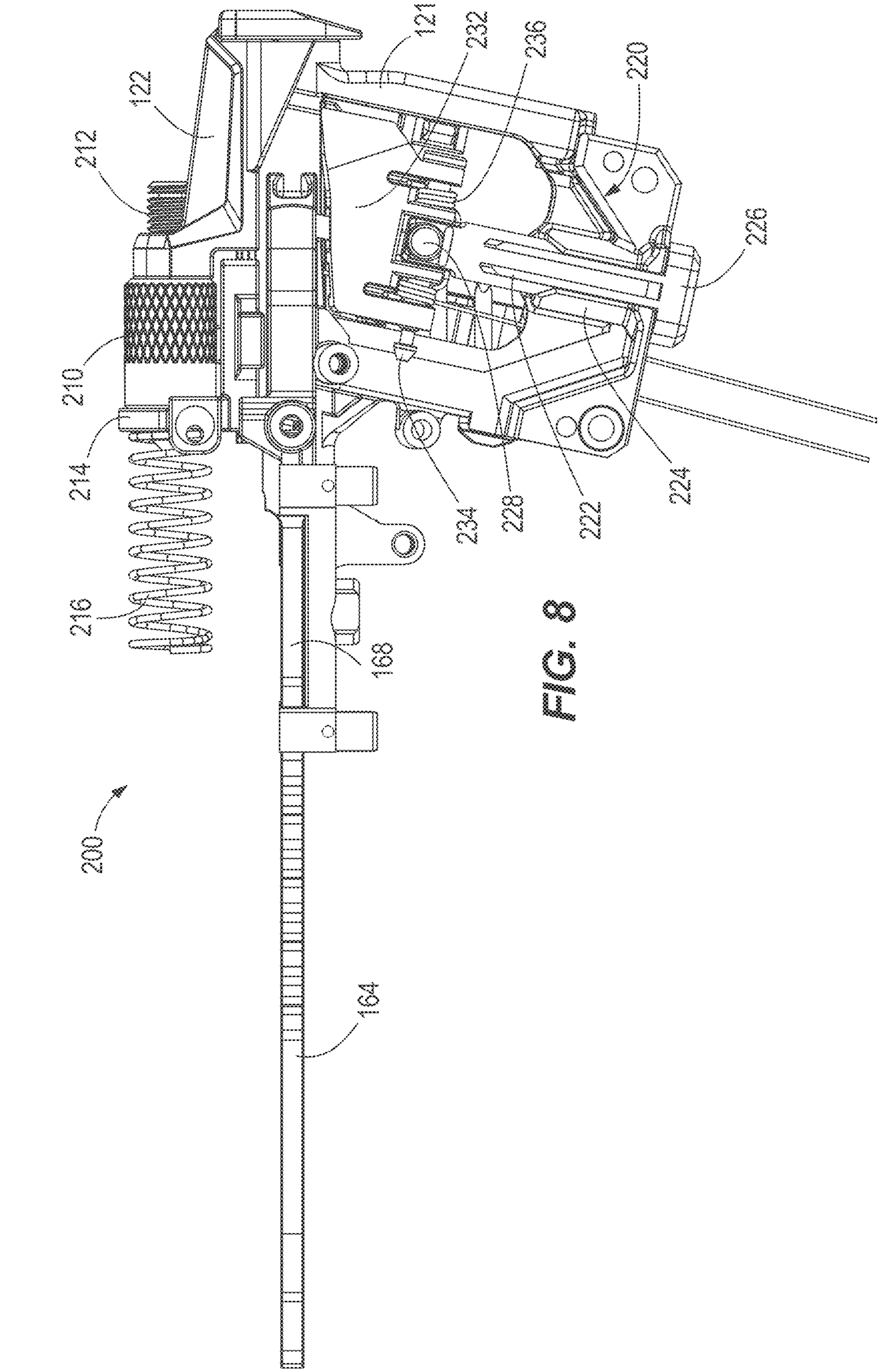
FIG. 8 is a left-side view of the nosepiece assembly of FIG. 7.

As illustrated, the nosepiece assembly 200 of the fastener driver 100 also includes a fastener delivery mechanism 220. As best shown in FIG. 8, the fastener delivery mechanism 220 includes a spring-loaded support post 222 that is slidably disposed within a bracket 224 on the nosepiece 121. The support post 222 includes a proximal end 226 and a distal end 228. A spring 230 (FIG. 6) is installed in compression adjacent the proximal end 226 of the support post 222 to bias the support post 222 toward the fastener driving channel 206 of the nosepiece 121. An advancer 232 is mounted on the distal end 228 of the support post 222 via a hinge pin 234. A torsional spring 236 is disposed on the hinge pin 234 to bias the advancer 232 around the hinge pin 234 toward the nosepiece 121. A linkage assembly 238 (FIG. 6) is actuated by the driver blade 164 to actuate the fastener delivery mechanism 220. For example, as the driver blade 164 is returned to the TDC position, the driver blade 164 engages the linkage assembly 238 to actuate the fastener delivery mechanism 220 and move a fastener into the fastener driving channel 206 of the nosepiece 121 to be fired when the trigger is pulled.

Figure 7:
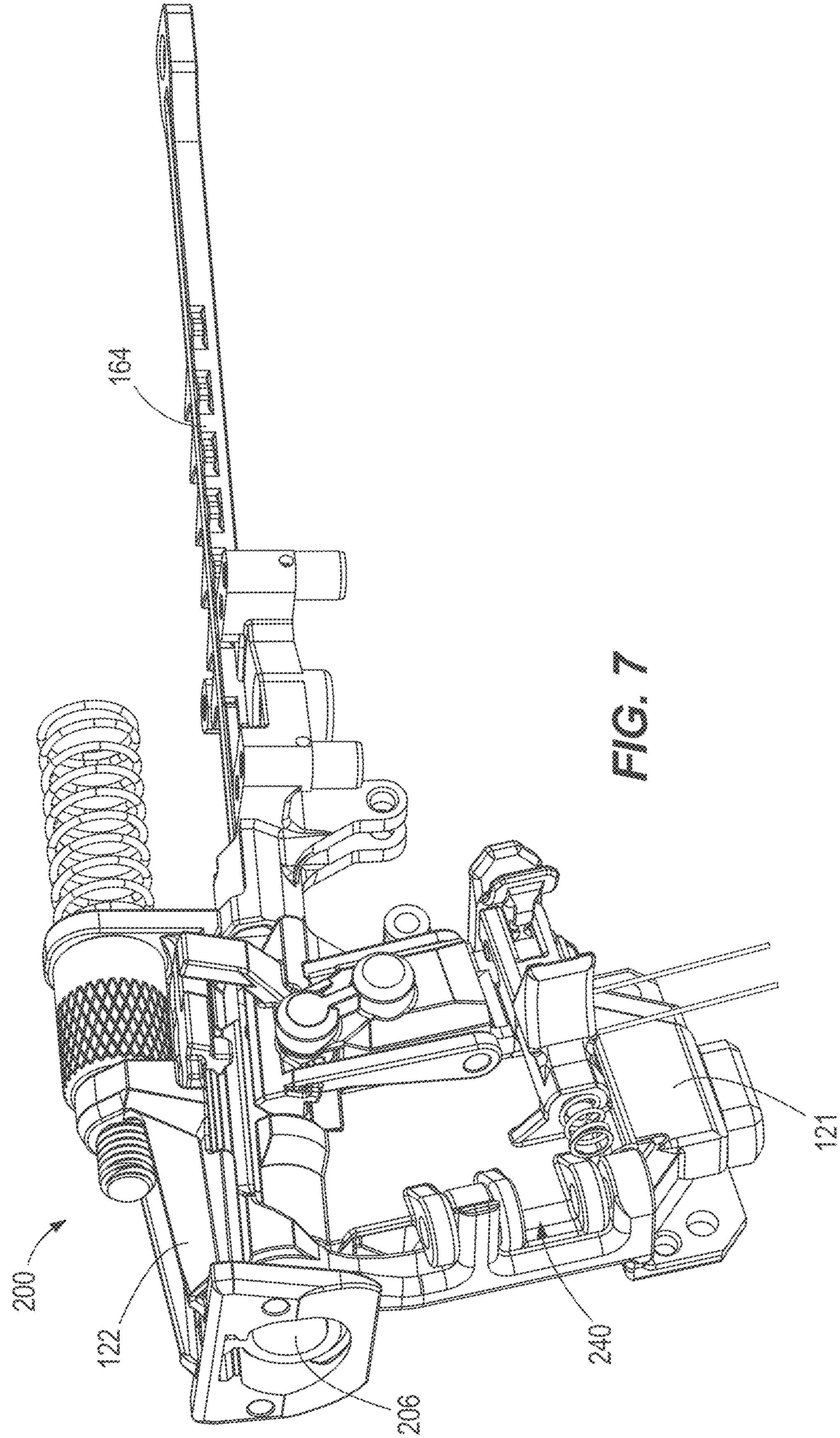
FIG. 7 is a front perspective view a nosepiece assembly for the fastener driver of FIG. 1.
Figure 9:
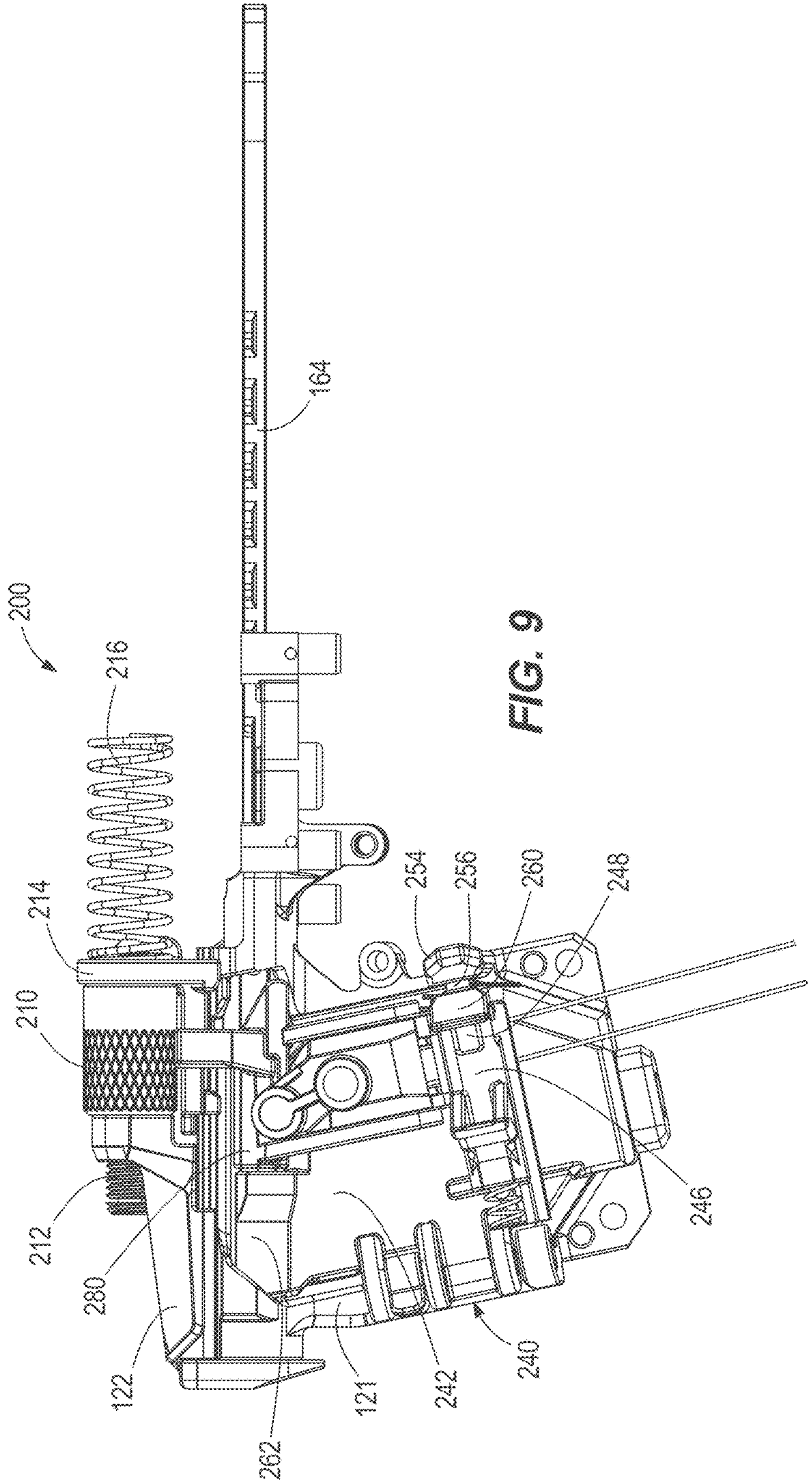
FIG. 9 is a right-side view of the nosepiece assembly of FIG. 7.
Figure 10:
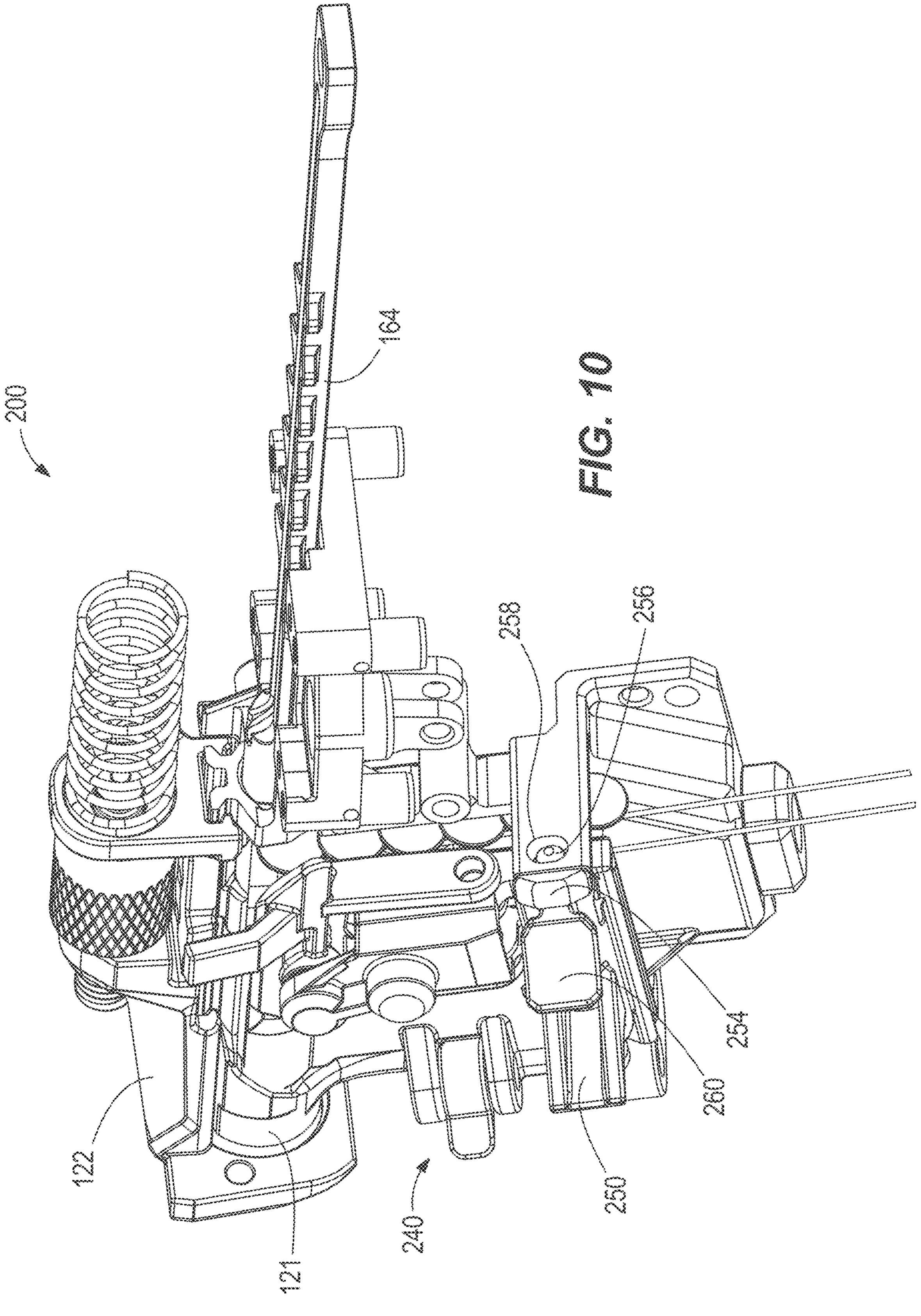
FIG. 10 is a rear perspective view of the nosepiece assembly of FIG. 7.
Figure 11:
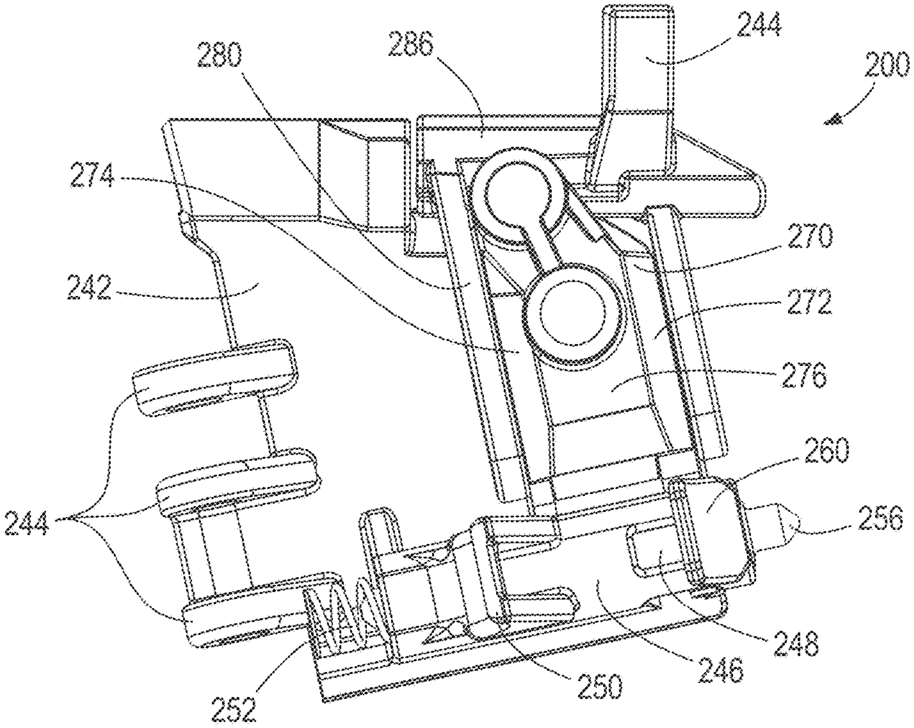
FIG. 11 is a right-side view of a nosepiece access door assembly for the nosepiece assembly of FIG. 7.
Figure 12:
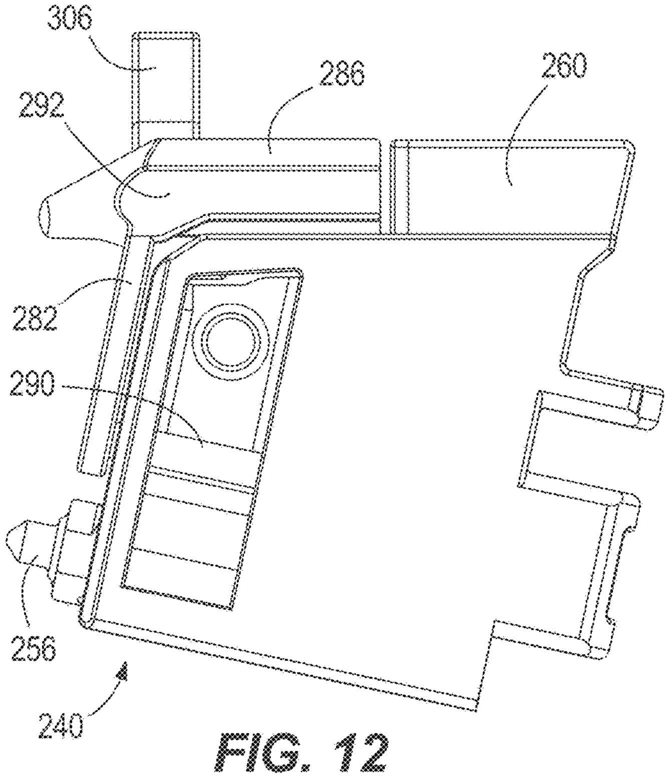
FIG. 12 is a left-side view of the nosepiece access door assembly of FIG. 11.
Figure 13:
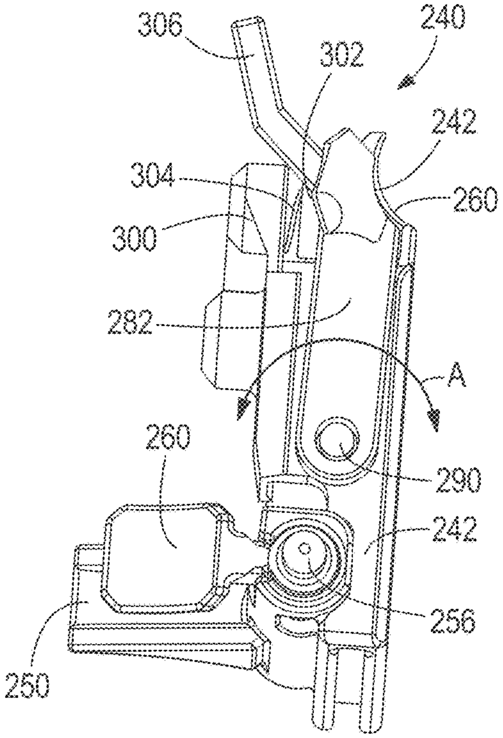
FIG. 13 is an end view of the nosepiece access door assembly of FIG. 11.
Figure 14:
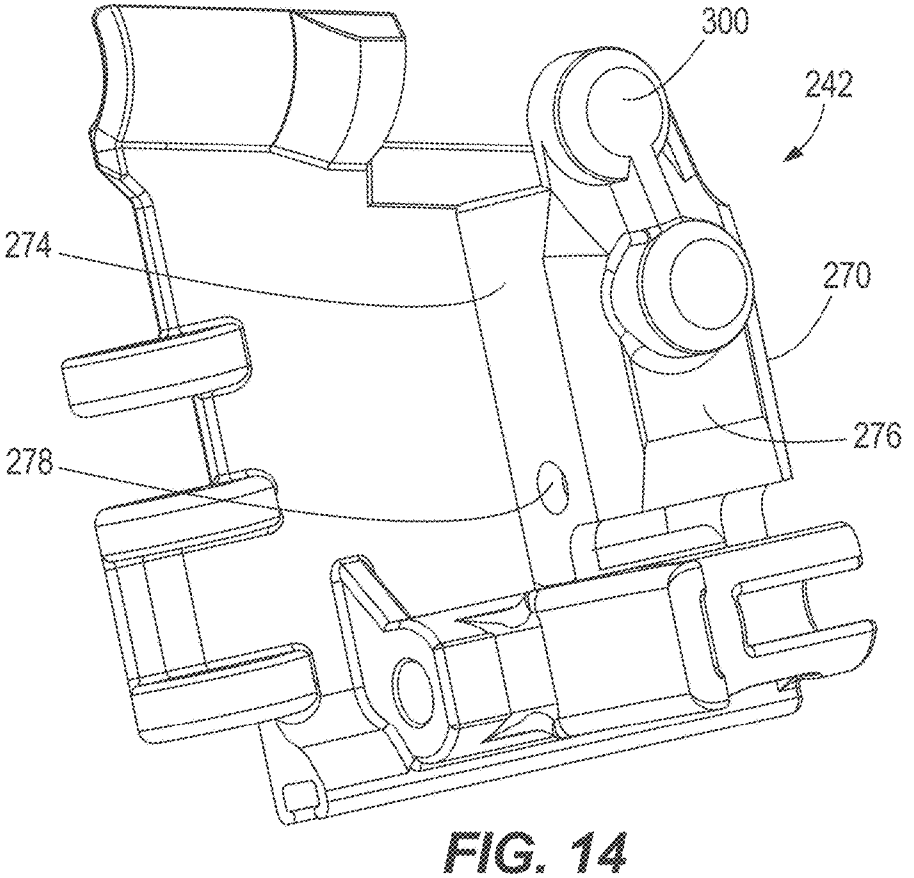
FIG. 14 is a perspective view of a nosepiece access door for the nosepiece access door assembly of FIG. 11.
Figure 15:
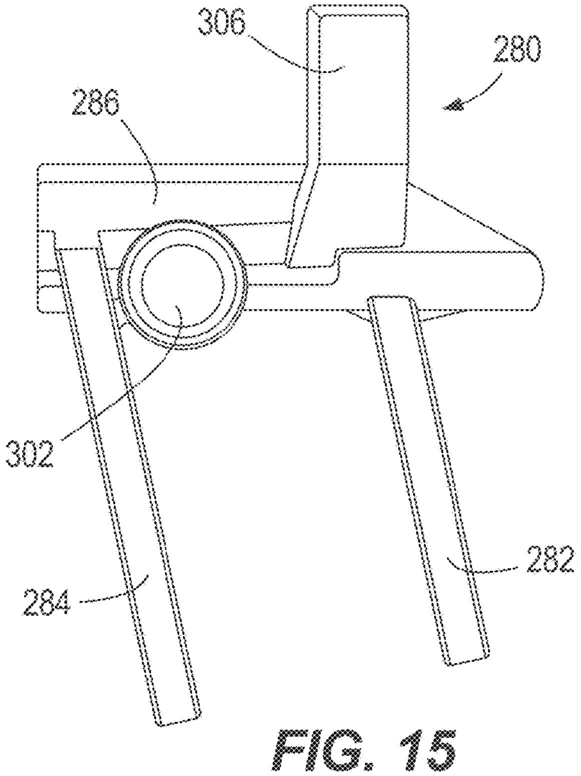
FIG. 15 is a left-side view of a dry-fire lock out lever for the nosepiece access door assembly of FIG. 11.
Figure 16:
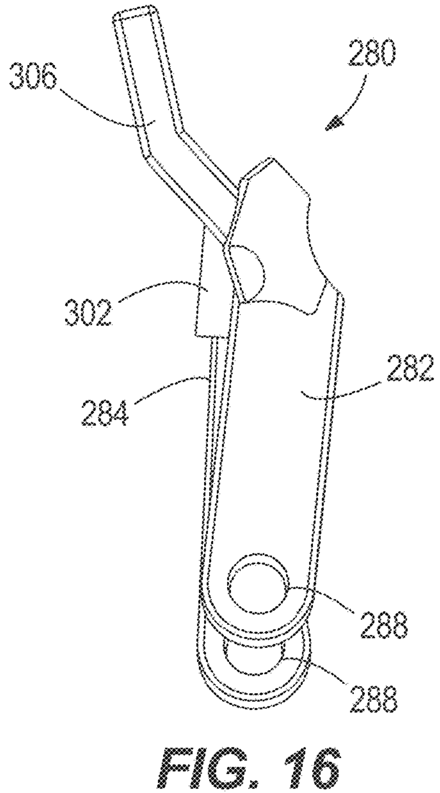
FIG. 16 is an end view of the view of the dry-fire lock out lever of FIG. 15.

As best shown in FIGS. 7, 9, and 10, the nosepiece assembly 200 of the fastener driver 100 further includes a nosepiece access door assembly 240 hingedly coupled to the nosepiece 121. FIGS. 11-16 illustrate the details of the nosepiece access door assembly 240. As shown in FIGS. 11-16, the nosepiece access door assembly 240 includes a nosepiece access door 242 with plurality of hinge knuckles 244 through which a hinge pin fits and around which the nosepiece access door 242 rotates relative to the nosepiece 121. Further, the nosepiece access door 242 includes a generally cylindrical bracket 246 in which a spring loaded latch pin 248 is slidably disposed. A fixed handle 250 extends from the nosepiece access door 242 near an end of the cylindrical bracket 246. A spring 252 is disposed adjacent an end of the latch pin 248 to bias the latch pin 248 outward from the cylindrical bracket 246 toward a latch tab 254 (FIG. 10) on the nosepiece 121 adjacent the nosepiece access door 242 and aligned with the latch pin 248. The latch pin 248 includes a catch 256 that engages a bore 258 (FIG. 10) in the latch tab 254 to keep the nosepiece access door 242 closed. Further, the latch pin 248 includes a mobile handle 260 that is configured to be pushed toward the fixed handle 250 to push the latch pin 248 and compress the spring 252 while releasing the catch 256 from the bore 258 in the latch tab 254 to allow the nosepiece access door 242 to rotate about the hinge knuckles 244 into an open position to provide access to the fasteners within the nosepiece 121.

The nosepiece access door 242 further includes a first fastener guide slot 262 along a portion of the top of the nosepiece access door 242. As shown, the first fastener guide slot 262 is fixed relative to the nosepiece access door 242. Further, the first fastener guide slot 262 is shaped to match the curvature of the inner wall of the fastener driving channel 206 (FIG. 7).

As shown in FIGS. 11-14, the nosepiece access door 242 further includes a dry-fire lockout support bracket 270 that is generally boxed shaped and includes a first sidewall 272, a second sidewall 274, and a top plate 276. Each sidewall 272, 274 is formed with a lateral bore 278. A dry-fire lockout lever 280 fits over the dry-fire lockout support bracket 270. The dry-fire lockout lever 280 includes a first link 282 that extends along the first sidewall 272 and a second link 284 that extends along the second sidewall 274. A fastener guide body 286 extends between the links 282, 284. Further, each link 282, 284 includes a lateral bore 288. A pin 290 extends through the bores 288 in the links 282, 284 of the dry-fire lockout lever 280 and the bores 278 in the sidewalls 272, 274 of the dry-fire lockout support bracket 270. As such, the dry-fire lockout lever 280 rotates back-and-forth on the nosepiece access door 242 about the pin 290 as indicated by arc A.

The dry-fire lockout lever 280 further includes a second fastener guide slot 292 along the length of the fastener guide body 286. The second fastener guide slot 292 is shaped to match the curvature of the inner wall of the fastener driving channel 206 (FIG. 7) and the curvature of the first fastener guide slot 262 on the nosepiece access door 242. The nosepiece access door 242 includes a first spring pocket 300 formed on the top plate 276 of the dry-fire lockout support bracket 270. The dry-fire lockout lever 280 includes a second spring pocket 302 formed on the fastener guide body 286. The second spring pocket 302 is aligned with the first spring pocket 300 when the dry-fire lockout lever 280 is installed on the dry-fire lockout support bracket 270 of the nosepiece access door 242 and a spring 304 is installed in the spring pockets 300, 302 to bias the dry-fire lockout lever 280 toward the fastener driving channel 206 of the nosepiece 121. The dry-fire lockout lever 280 further includes a locking arm 306 that moves as the dry-fire lockout lever 280 rotates on the dry-fire lockout support bracket 270 with respect to the nosepiece access door 242.

Figure 17:
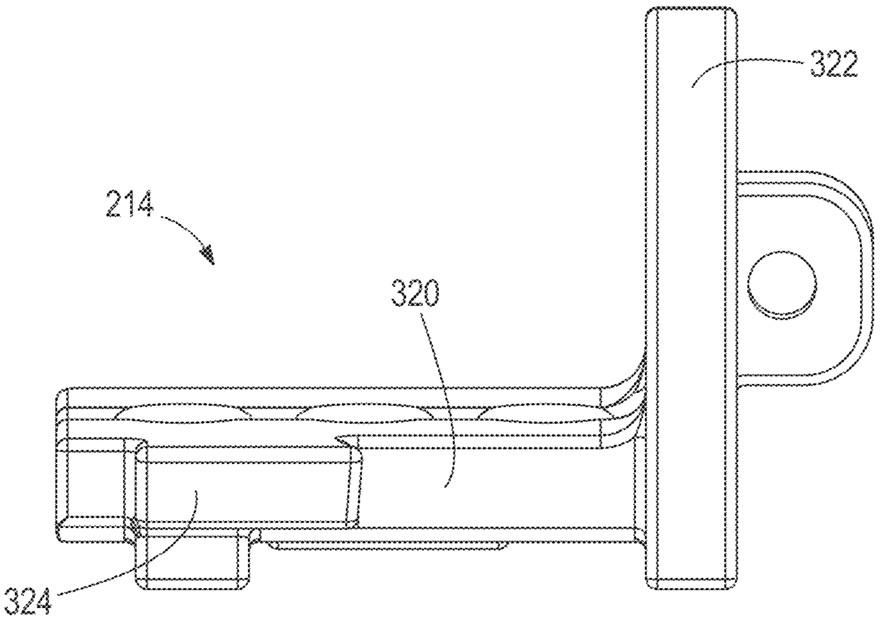
FIG. 17 is a right-side view of a workpiece contact bracket lock for the nosepiece assembly of FIG. 7.
Figure 18:
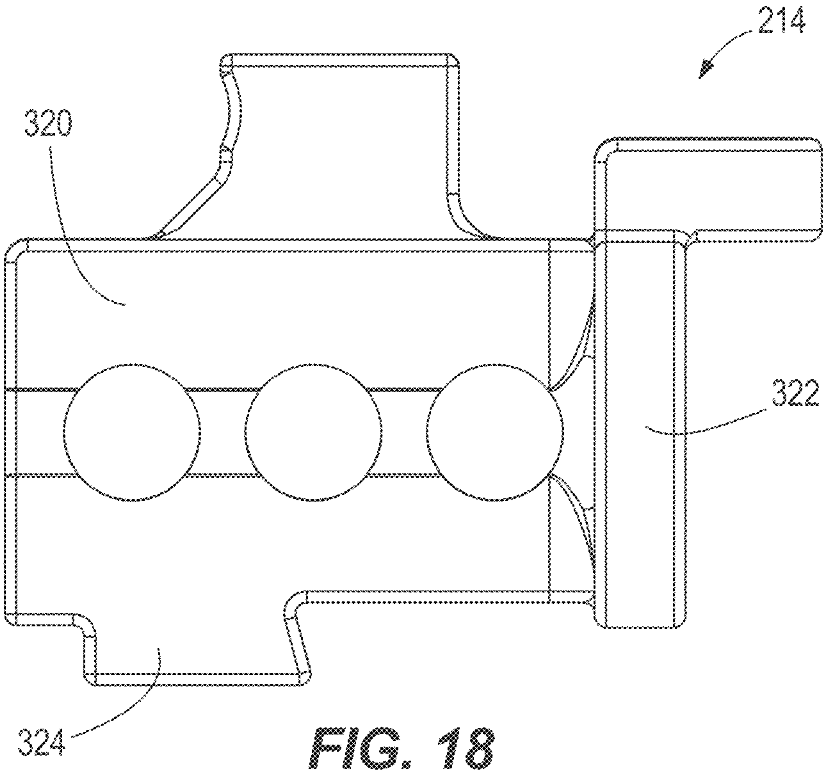
FIG. 18 is a top view of the workpiece contact bracket lock of FIG. 17.

Referring now to FIGS. 17 and 18, details of the workpiece contact bracket lock 214 are shown. The workpiece contact bracket lock 214 includes a base plate 320. A depth adjuster support 322 extends in a generally upward direction from the base plate 320 and is substantially perpendicular to the base plate 320. Further, a lockout tab 324 extends from a side of the base plate 320 and is parallel to and aligned with the base plate 320. As described in greater detail below, the lockout tab 324 selectively engages the locking arm 306 on the dry-fire lockout lever 280 to prevent the fastener driver 100 from being fired when no fastener is present in the fastener driving channel 206 of the nosepiece 121.

Figure 19:
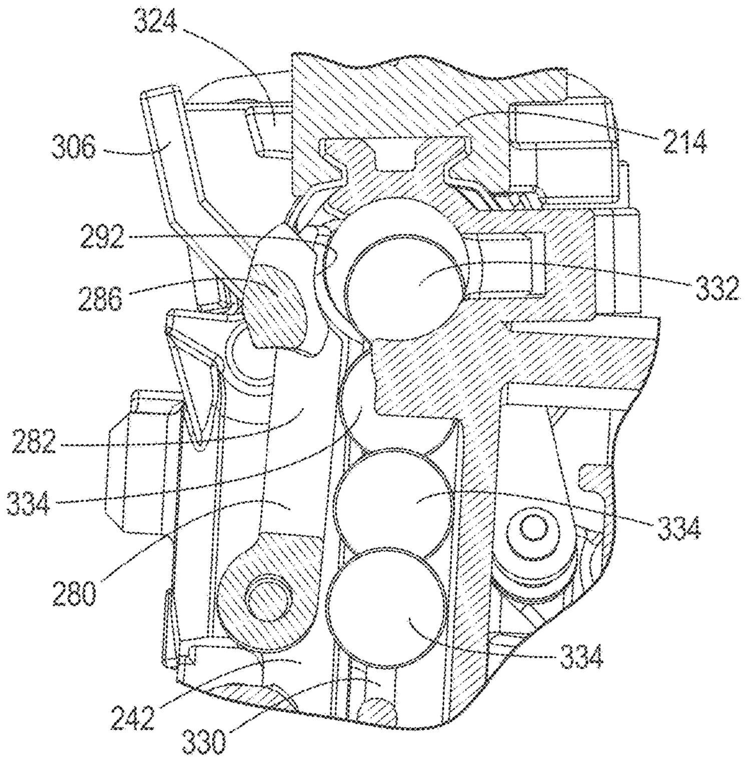
FIG. 19 is a first operational view of the nosepiece assembly of FIG. 7 with the dry-fire lockout lever in a first bypass position.
Figure 20:
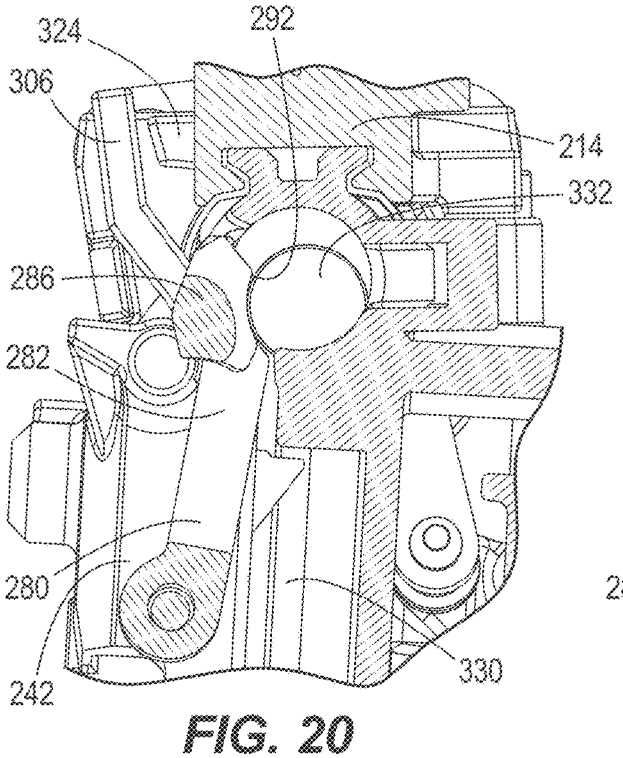
FIG. 20 is a second operational view of the nosepiece assembly of FIG. 7 with the dry-fire lockout lever in a second bypass position.
Figure 21:
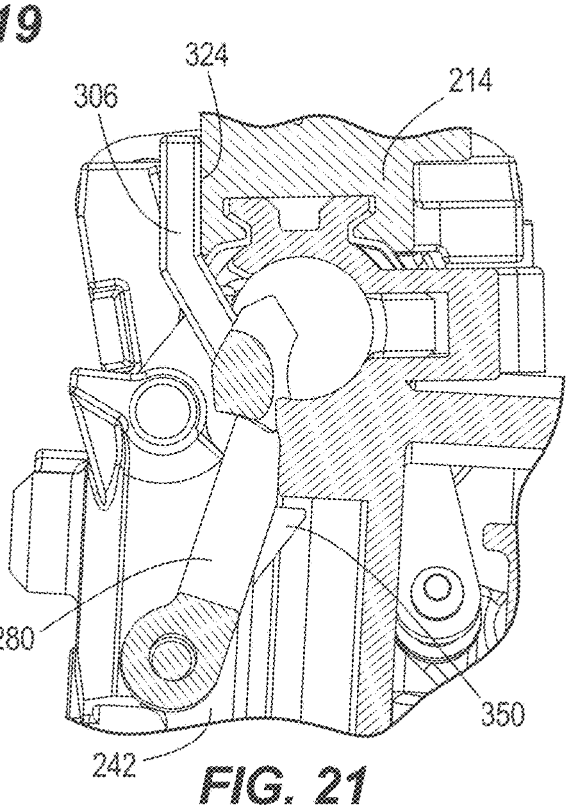
FIG. 21 is a third operational view of the nosepiece assembly of FIG. 7 with the dry-fire lockout lever in a lockout position.

FIGS. 19-21 illustrate the operation of the dry-fire lockout lever 280. When the nosepiece access door 242 is closed and locked in place with respect to the nosepiece 121, the first link 282 of the dry-fire lockout lever 280 extends along a fastener delivery channel 330 that leads to the fastener driving channel 206 of the nosepiece 121. As shown in FIG. 19, a loaded fastener 332 is disposed within the fastener driving channel 206 and a plurality of queued fasteners 334, i.e., the fasteners waiting to be loaded. As further shown in FIG. 19, the one or more of the queued fasteners 334 engages the first link 282 of the dry-fire lockout lever 280 to rotate the dry-fire lockout lever 280 to a first bypass position in which the locking arm 306 on the dry-fire lockout lever 280 is clear of the lockout tab 324 on the workpiece contact bracket lock 214. This allows the workpiece contact bracket 122 to slide on the nosepiece 121 to allow the fastener driver 100 to be fired. Moreover, in the first bypass position, the fastener guide body 286 and the second fastener guide slot 292 formed thereon is disengaged from the loaded fastener 332 and does not get impacted by the driver blade 164 when the fastener driver 100 is fired and the driver blade 164 moves to the BDC position and impacts the loaded fastener 332 to expel the loaded fastener 332 from the fastener driving channel 206 and into a workpiece. As such, the queued fastener 334 moves the dry-fire lockout lever 280 to a position clear of the driver blade 164 as it moves to the BDC position.

As shown in FIG. 20, when there is only a loaded fastener 332 and no queued fasteners, the dry-fire lockout lever 280 moves to a second bypass position in which the locking arm 306 on the dry-fire lockout lever 280 is clear of the lockout tab 324 on the workpiece contact bracket lock 214. Again, the clearance of these two parts, the locking arm 306 and the lockout tab 324, allows the workpiece contact bracket 122 to slide on the nosepiece 121 to allow the fastener driver 100 to be fired. However, in the second bypass position, the fastener guide body 286 and the second fastener guide slot 292 formed thereon is engaged with the loaded fastener 332 to hold the loaded fastener 332 within the fastener driving channel 206. As such, in the second bypass position, the fastener guide body 286 of the dry-fire lockout lever 280 may be impacted by the driver blade 164 when the fastener driver 100 is fired and the driver blade 164 moves to the BDC position and impacts the loaded fastener 332 to expel the loaded fastener 332 from the fastener driving channel 206 and into a workpiece.

When the fastener driver 100 is emptied of fasteners and there are no queued fasteners 334 or a loaded fastener 332, the dry-fire lockout lever 280 moves to a lockout position in which the locking arm 306 on the dry-fire lockout lever 280 engages the lockout tab 324 on the workpiece contact bracket lock 214 to prevent the workpiece contact bracket 122 from sliding on the nosepiece 121. Thus, the fastener driver 100 is prevented from firing when no fasteners are in the fastener driver 100. FIG. 20 further shows that a fastener pawl 350, which prevents unwanted motion of the fasteners 332, 334 toward the magazine receptacle portion 124, is disposed on the same pin 290 as the dry-fire lockout lever 280 and also rotates about the pin 290. As such, the dry-fire lockout lever 280 pivots, or rotates, on the same pin as the fastener pawl 350.

FIGS. 22-25 depict another nosepiece assembly 400 that is configured for use with the fastener driver 100 depicted in FIGS. 1-6. As shown, the nosepiece assembly 400 also includes the nosepiece 121 with the workpiece contact bracket 122 mounted thereon. The driver blade 164 extends into a driving channel 406 formed in the nosepiece 121. As shown, the nosepiece assembly 400 of the fastener driver 100 includes a depth adjuster 410 having a threaded shaft 412 that is threadably engaged with the workpiece contact bracket 122. The depth adjuster 410 is rotatable to change a linear position of the workpiece contact bracket 122 relative to the nosepiece 121. This changes the depth to which a fastener expelled from the fastener driver 100 is driven into a workpiece. A workpiece contact bracket lock 414 is mounted on the workpiece contact bracket 122 and supports the depth adjuster 410 and allows the depth adjuster 410 to rotate therein. A spring 416 is installed adjacent the workpiece contact bracket lock 414 to bias the workpiece contact bracket 122 forward on the nosepiece 121.

Figure 23:
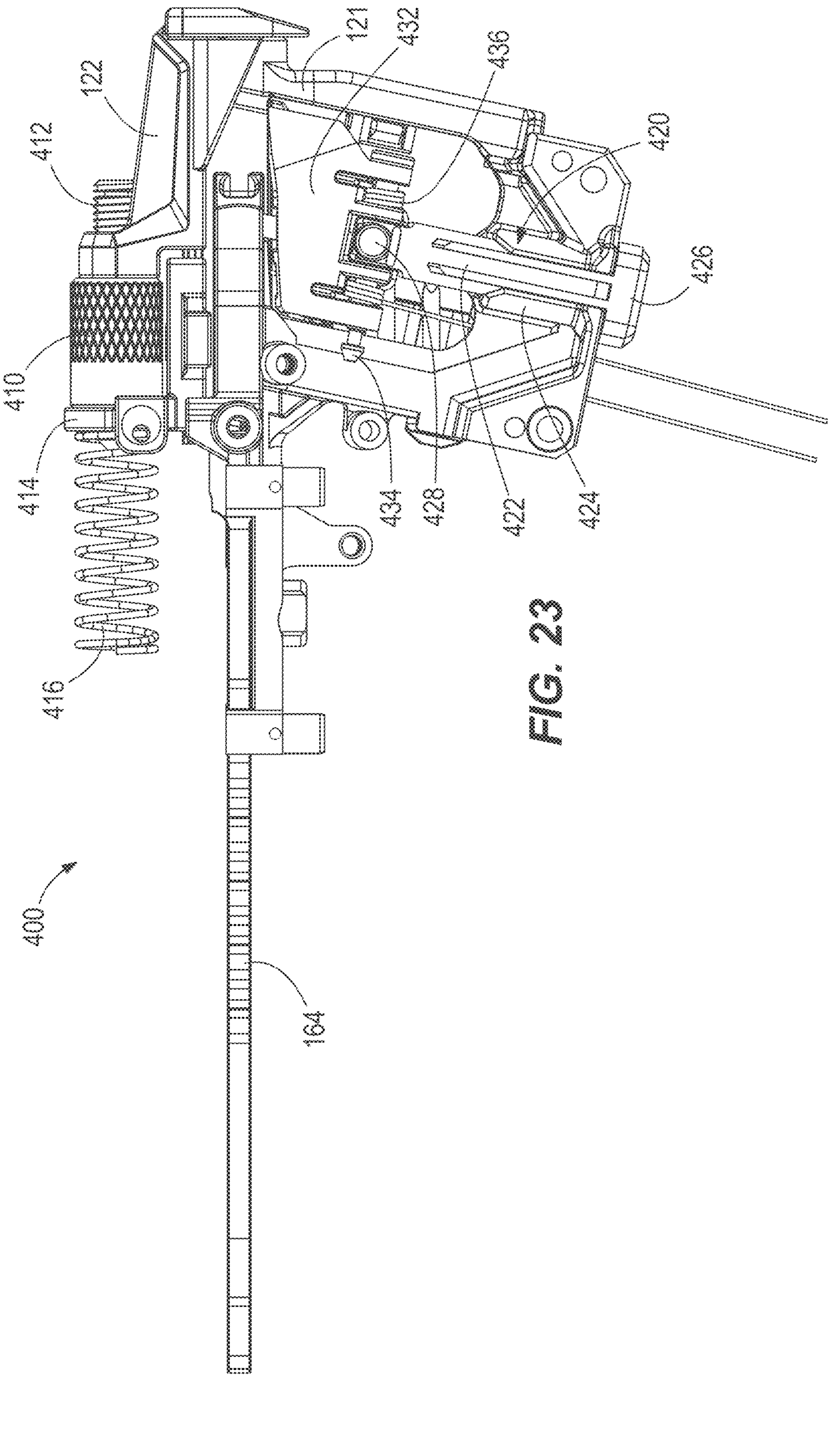
FIG. 23 is a left-side view of the nosepiece assembly of FIG. 22.

As illustrated, the nosepiece assembly 400 of the fastener driver 100 also includes a fastener delivery mechanism 420. As best shown in FIG. 23, the fastener delivery mechanism 420 includes a spring-loaded support post 422 that is slidably disposed within a bracket 424 on the nosepiece 121. The support post 422 includes a proximal end 426 and a distal end 428. A spring 430 (FIG. 6) is installed in compression adjacent the proximal end 426 of the support post 422 to bias the support post 422 toward the fastener driving channel 406 of the nosepiece 121. An advancer 432 is mounted on the distal end 428 of the support post 422 via a hinge pin 434. A torsional spring 436 is disposed on the hinge pin 434 to bias the advancer 432 around the hinge pin 434 toward the nosepiece 121. A linkage assembly 438 (FIG. 6) is actuated by the driver blade 164 to actuate the fastener delivery mechanism 420. For example, as the driver blade 164 is returned to the TDC position, the driver blade 164 engages the linkage assembly 438 to actuate the fastener delivery mechanism 420 and move a fastener into the fastener driving channel 406 of the nosepiece 121 to be fired when the trigger is pulled.

Figure 22:
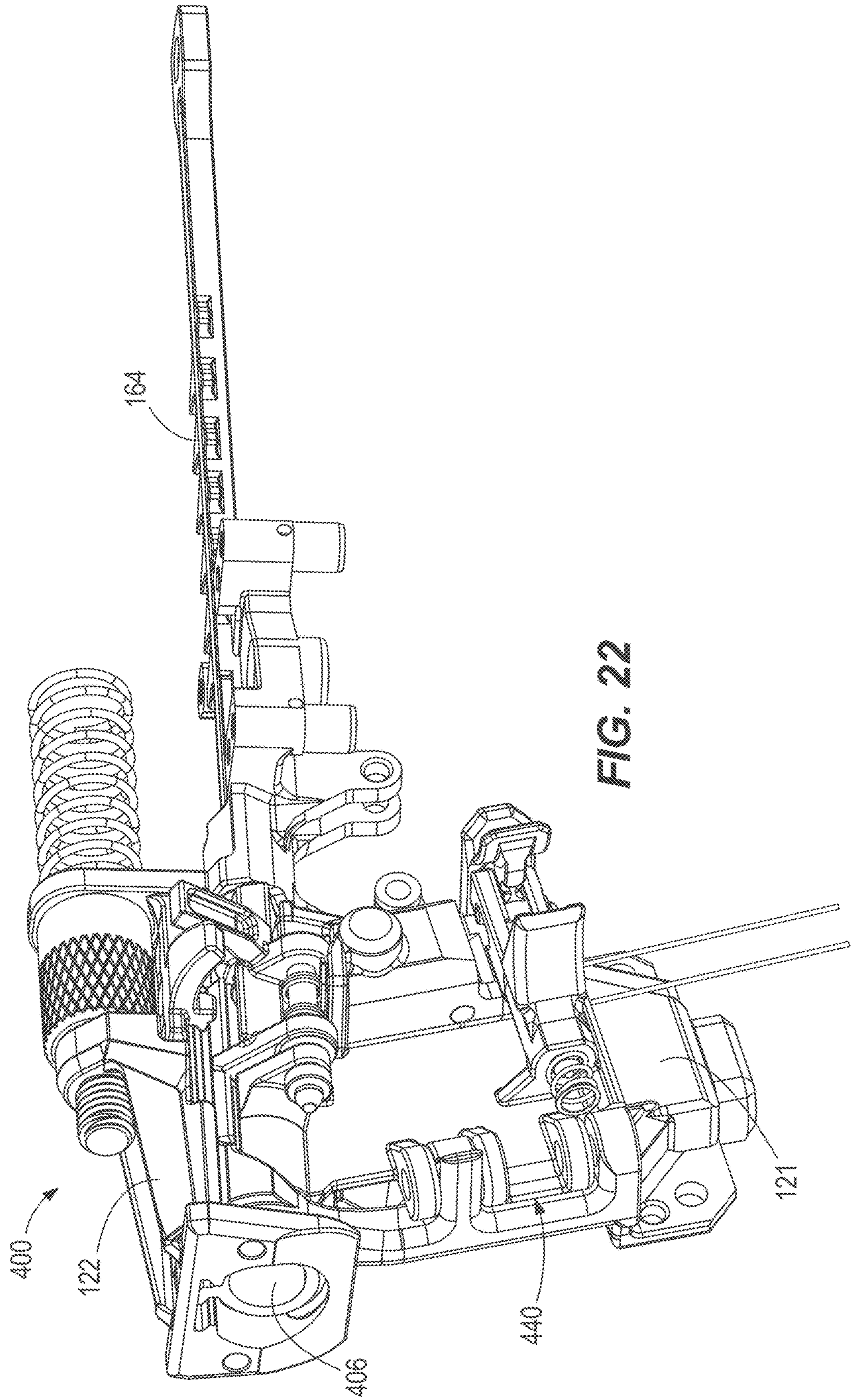
FIG. 22 is a front perspective view another nosepiece assembly for the fastener driver of FIG. 1.
Figure 24:
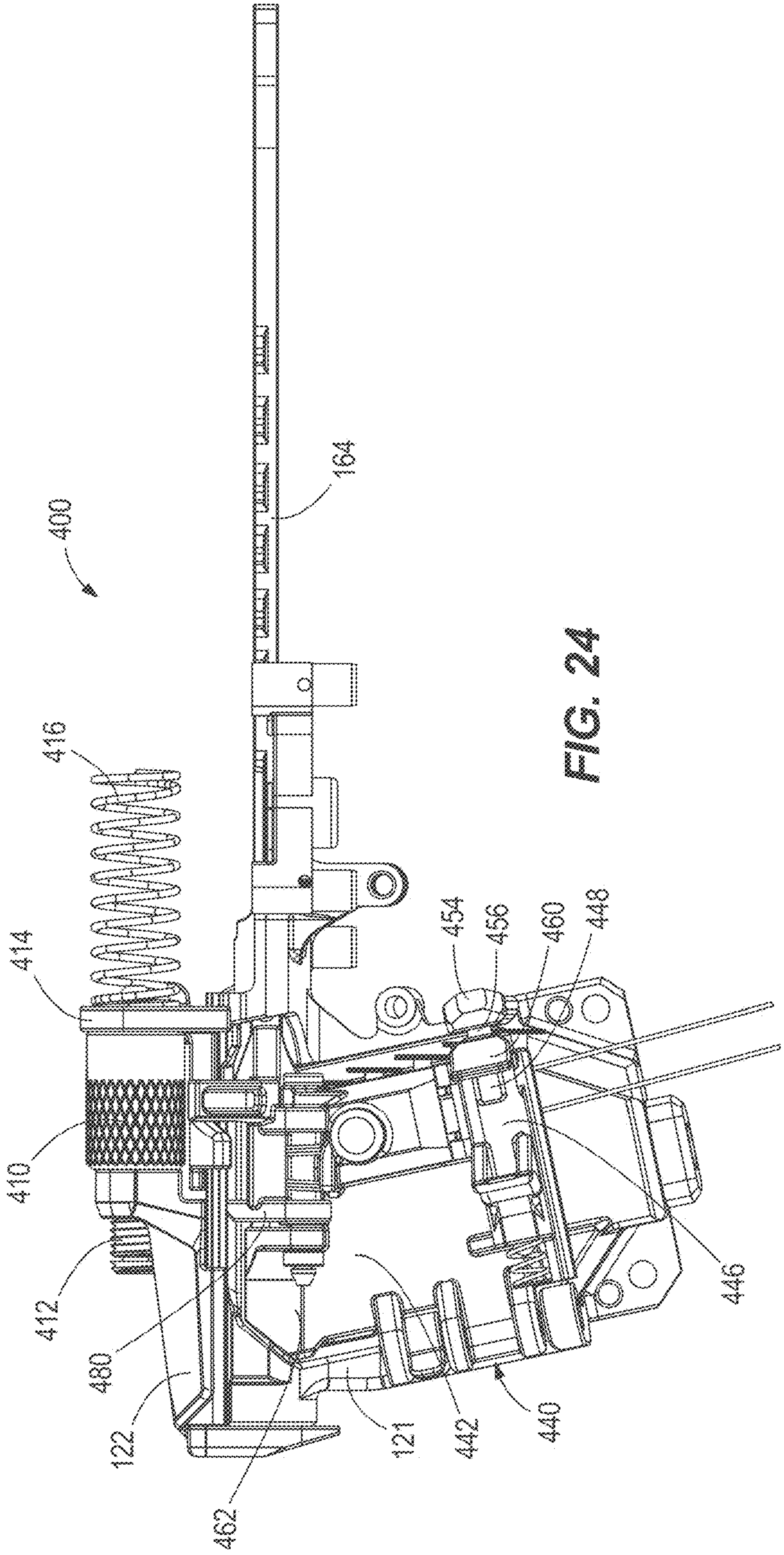
FIG. 24 is a right-side view of the nosepiece assembly of FIG. 22.
Figure 25:
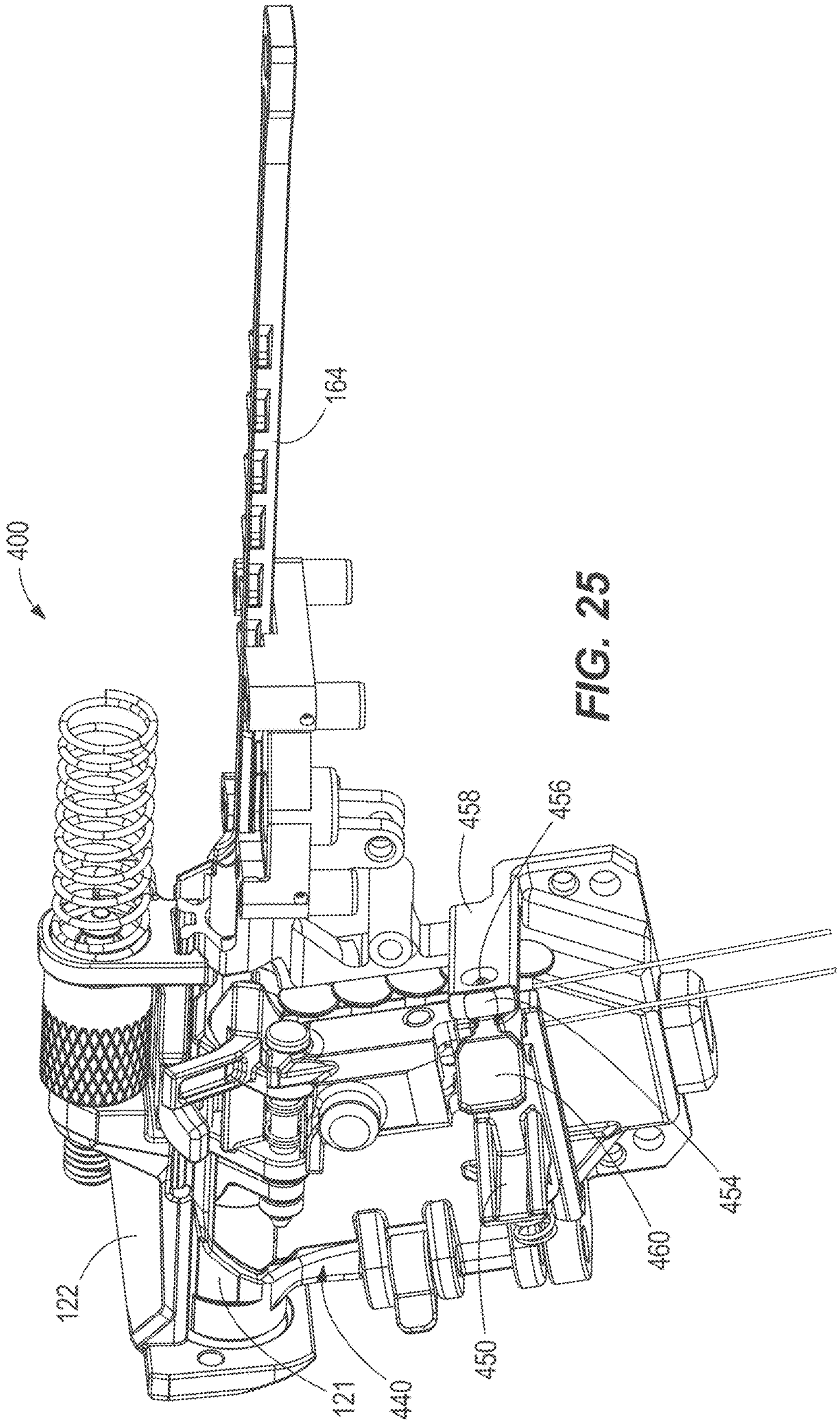
FIG. 25 is a rear perspective view of the nosepiece assembly of FIG. 22.
Figure 26:
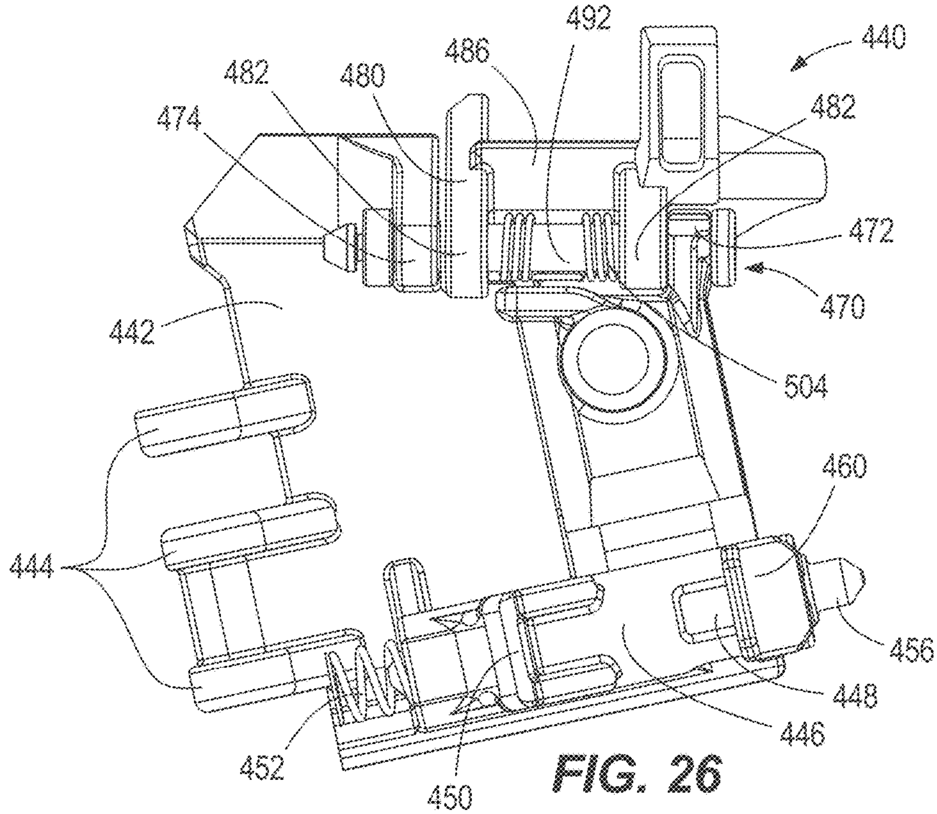
FIG. 26 is a right-side view of a nosepiece access door assembly for the nosepiece assembly of FIG. 22.
Figure 27:
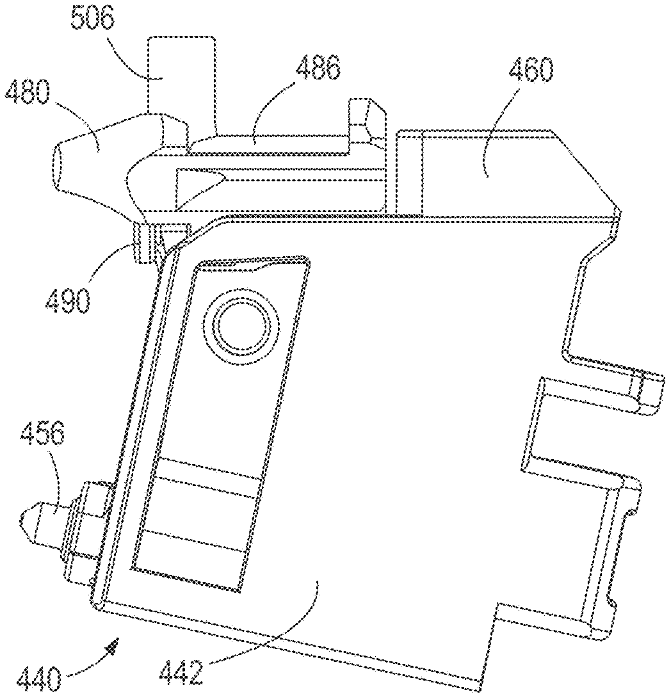
FIG. 27 is a left-side view of the nosepiece access door assembly of FIG. 26.
Figure 28:
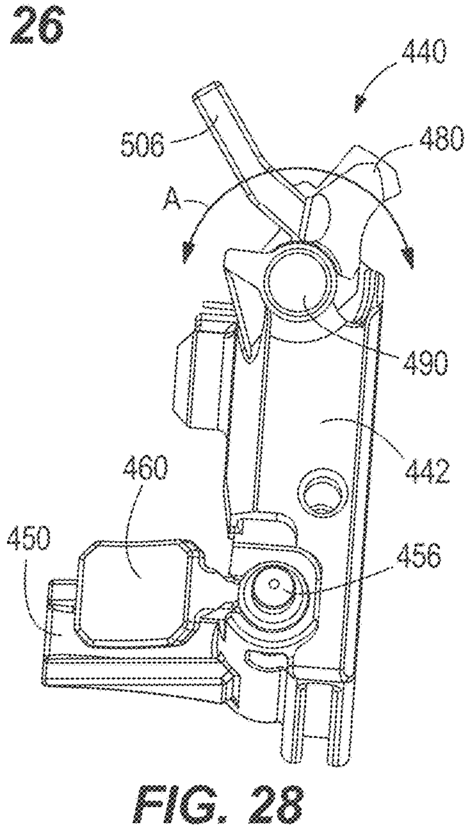
FIG. 28 is an end view of the view of the nosepiece access door assembly of FIG. 26.
Figure 29:
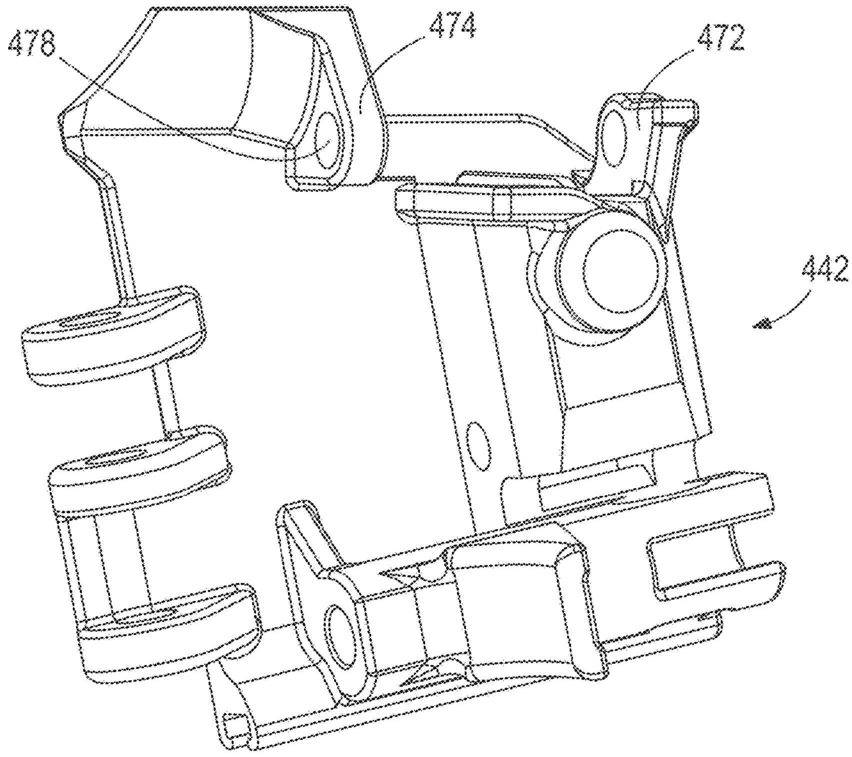
FIG. 29 is a perspective view of a nosepiece access door for the nosepiece access door assembly of FIG. 26.
Figure 30:
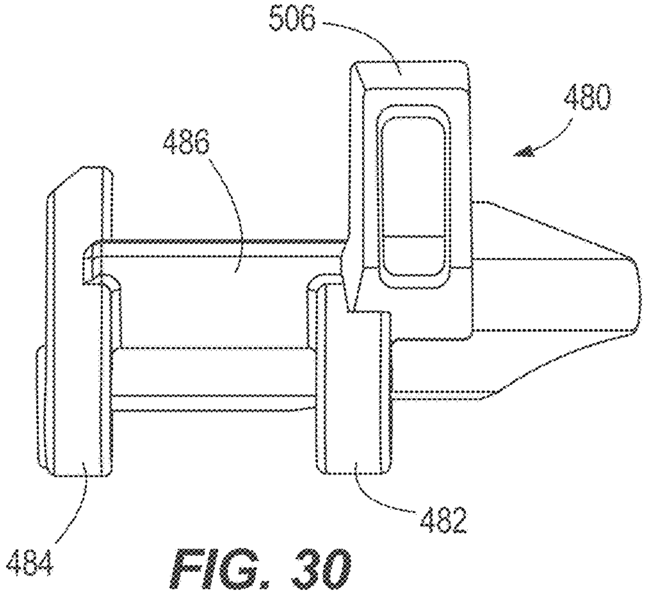
FIG. 30 is a left-side view of a dry-fire lock out lever for the nosepiece access door assembly of FIG. 26.
Figure 31:
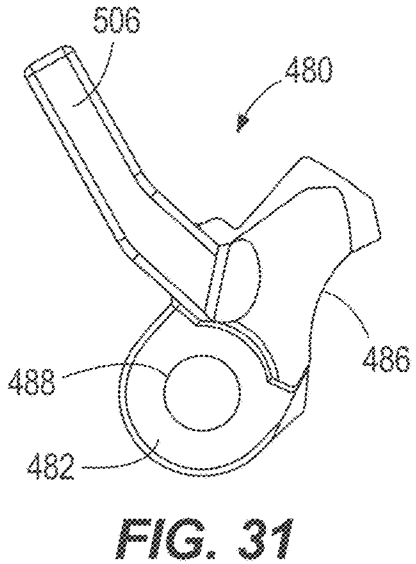
FIG. 31 is an end view of the view of the dry-fire lockout lever of FIG. 30.

As best shown in FIGS. 22, 24, and 25, the nosepiece assembly 400 of the fastener driver 100 further includes a nosepiece access door assembly 440 hingedly coupled to the nosepiece 121. FIGS. 26-31 illustrate the details of the nosepiece access door assembly 440. As shown in FIGS. 26-31, the nosepiece access door assembly 440 includes a nosepiece access door 442 with plurality of hinge knuckles 444 through which a hinge pin fits and around which the nosepiece access door 442 rotates relative to the nosepiece 121. Further, the nosepiece access door 442 includes a generally cylindrical bracket 446 in which a spring loaded latch pin 448 is slidably disposed. A fixed handle 450 extends from the nosepiece access door 442 near an end of the cylindrical bracket 446. A spring 452 is disposed adjacent an end of the latch pin 448 to bias the latch pin 448 outward from the cylindrical bracket 446 toward a latch tab 454 (FIG. 10) on the nosepiece 121 adjacent the nosepiece access door 442 and aligned with the latch pin 448. The latch pin 448 includes a catch 456 that engages a bore 458 (FIG. 10) in the latch tab 454 to keep the nosepiece access door 442 closed. Further, the latch pin 448 includes a mobile handle 460 that is configured to be pushed toward the fixed handle 450 to push the latch pin 448 and compress the spring 452 while releasing the catch 456 from the bore 458 in the latch tab 454 to allow the nosepiece access door 442 to rotate about the hinge knuckles 444 into an open position to provide access to the fasteners within the nosepiece 121.

The nosepiece access door 442 further includes a fastener guide slot 462 along a portion of the top of the nosepiece access door 442. As shown, the fastener guide slot 462 is fixed relative to the nosepiece access door 442. Further, the fastener guide slot 462 is shaped to match the curvature of the inner wall of the fastener driving channel 406 (FIG. 7).

As shown in FIGS. 26-29, the nosepiece access door 442 further includes a dry-fire lockout support bracket 470 that includes a first tab 472 and a second tab 474. Each tab 472, 474 is formed with a lateral bore 478. A dry-fire lockout lever 480 fits between the tabs 472, 474 of the dry-fire lockout support bracket 470. The dry-fire lockout lever 480 includes a knuckle 482 adjacent the first tab 472 and a second knuckle 484 adjacent the second tab 474. A fastener engagement body 486 extends between the knuckles 482, 484 and includes a fastener engagement surface 488. Further, each knuckle 482, 484 includes a lateral bore 490. A pin 492 extends through the bores 490 in the knuckles 482, 484 of the dry-fire lockout lever 480 and the bores 478 in the tabs 472, 474 of the dry-fire lockout support bracket 470. As such, the dry-fire lockout lever 480 rotates back-and-forth on the nosepiece access door 442 about the pin 492 as indicated by arc A. A torsional spring 504 is installed around the pin 492 to bias the dry-fire lockout lever 480 toward the fastener driving channel 406 of the nosepiece 121. The dry-fire lockout lever 480 further includes a locking arm 506 that moves as the dry-fire lockout lever 480 rotates on the dry-fire lockout support bracket 470 with respect to the nosepiece access door 442.

Figure 32:
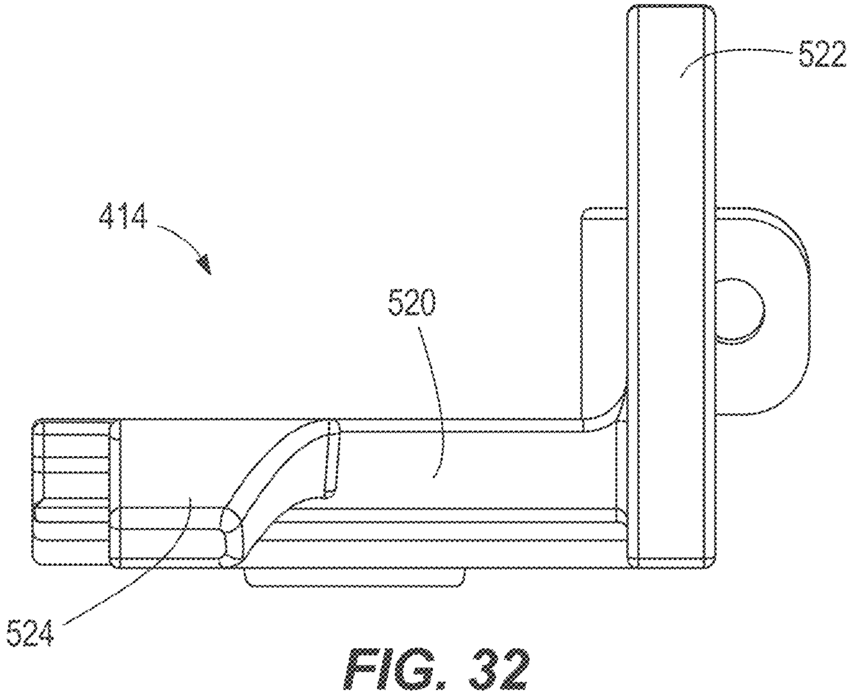
FIG. 32 is a right-side view of a workpiece contact bracket lock for the nosepiece assembly of FIG. 22.
Figure 33:
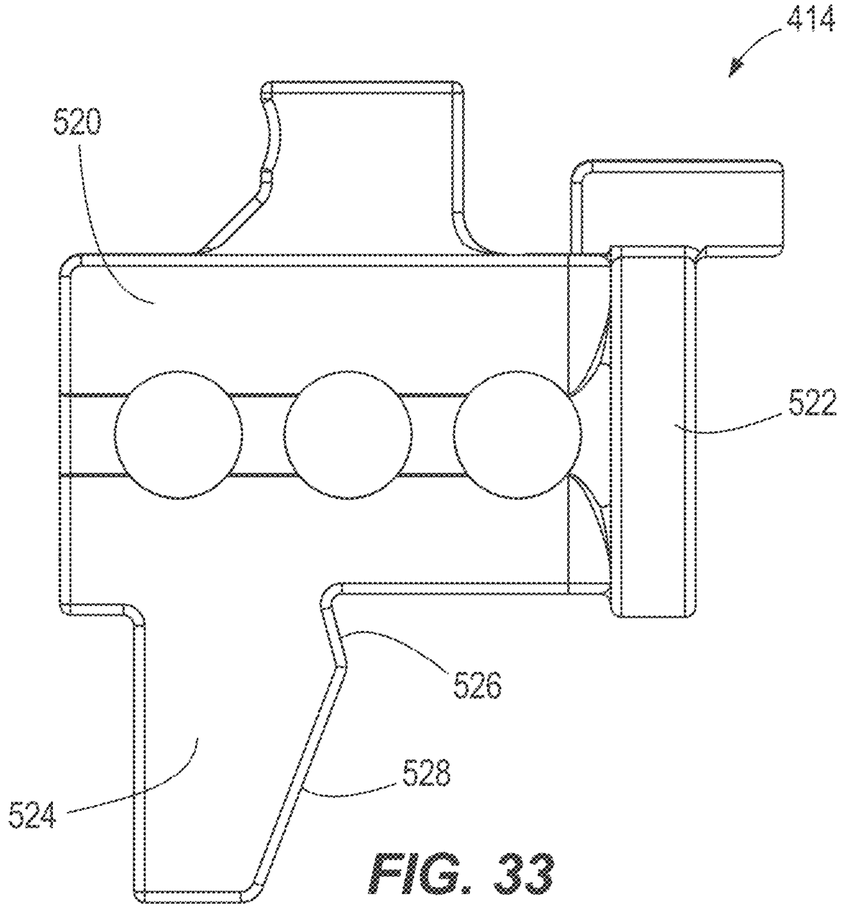
FIG. 33 is a top view of the workpiece contact bracket lock of FIG. 32.

Referring now to FIGS. 32 and 33, details of the workpiece contact bracket lock 414 that is disposed on the workpiece contact bracket 122 are shown. The workpiece contact bracket lock 414 includes a base plate 520. A depth adjuster support 522 extends in a generally upward direction from the base plate 520 and is substantially perpendicular to the base plate 520. Further, a tab 524 extends from a side of the base plate 520 and is parallel to and aligned with the base plate 520. That tab 524 includes a locking portion 526 and a cam portion 528. As described in greater detail below, the locking portion 526 of the tab 524 selectively engages the locking arm 506 on the dry-fire lockout lever 480 to prevent the fastener driver 100 from being fired when no fastener is present in the fastener driving channel 406 of the nosepiece 121. Further, the cam portion 528 of the tab 524 selectively engages the locking arm 506 to rotate the locking arm 506 away from the nosepiece 121.

Figure 34:
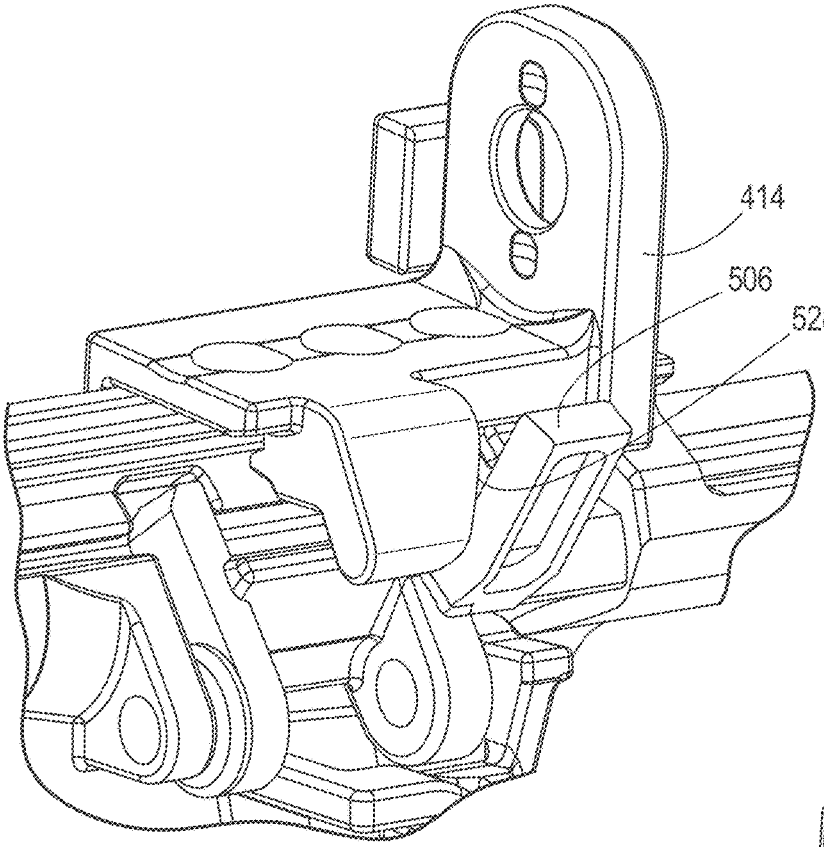
FIG. 34 is a first operational view of the nosepiece assembly of FIG. 22 with the dry-fire lockout in a first bypass position.
Figure 35:
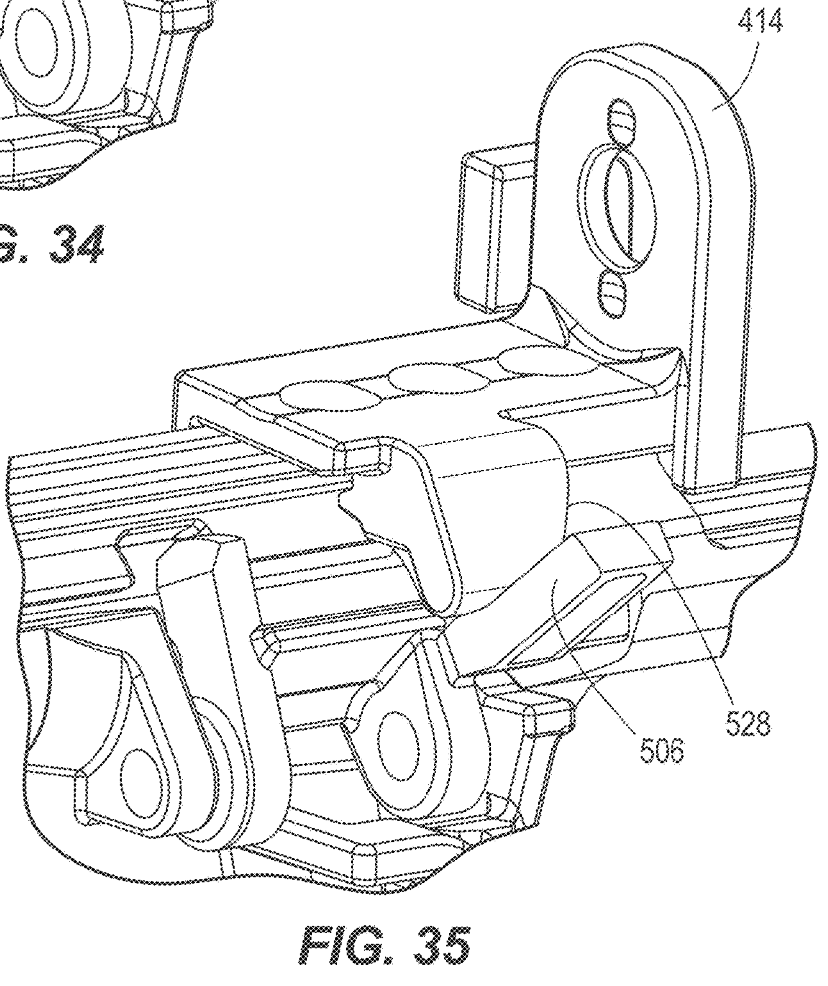
FIG. 35 is a second operational view of the nosepiece assembly of FIG. 22 with the dry-fire lockout in a second bypass position.

FIGS. 34 and 35 illustrate the operation of the dry-fire lockout lever 480. When the nosepiece access door 442 is closed and locked in place with respect to the nosepiece 121, the fastener engagement body 486 of the dry-fire lockout lever 480 extends along the fastener driving channel 406 of the nosepiece 121. As shown in FIG. 34, when a fastener is loaded into the fastener driving channel 406, the loaded fastener engages the fastener engagement surface 488 of the dry-fire lockout lever 480 and rotates the dry-fire lockout lever 480 away from the nosepiece and into a first bypass position. In the first bypass position, the locking arm 506 of the dry-fire lockout lever 480 is disengaged from the locking portion 526 of the tab 524 on the workpiece contact bracket lock 414. However, the fastener engagement surface 488 of the dry-fire lockout lever 480 remains engaged with the loaded fastener.

When the user places the workpiece contact bracket 122 on a workpiece and moves the fastener driver 100 toward the workpiece, the workpiece contact bracket 122 slides on the nosepiece 121 as shown in FIG. 35. As the workpiece contact bracket 122 slides on the nosepiece 121, the cam portion 528 on the tab 524 of the workpiece contact bracket lock 414 pushes against the locking arm 506 and rotates the dry-fire lockout lever 480 further away from the nosepiece into a second bypass position. In the second bypass position, the locking arm 506 of the dry-fire lockout lever 480 is moved further away from the nosepiece 121 and the fastener engagement surface 488 of the dry-fire lockout lever 480 is disengaged from the loaded fastener and no longer contacts the loaded fastener. As such, when the fastener driver 100 is fired, the driver blade 164 does not contact any portion of the dry-fire lockout lever 480 as it moves to the BDC position. The workpiece contact bracket 122, e.g., the cam portion 528 on the tab 524 of the workpiece contact bracket lock 414, rotates the dry-fire lockout lever 480 into a position clear of the driver blade 164.

When the fastener driver 100 is emptied of fasteners, the dry-fire lockout lever 480 rotates toward the fastener driving channel 406 of the nosepiece 121 into a lockout position. In the lockout position, the locking arm 506 is aligned with, or engages, the locking portion 526 of the tab 524 on the workpiece contact bracket lock 414 to prevent the workpiece contact bracket 122 from sliding on the nosepiece 121. Thus, the fastener driver 100 is prevented from firing when the fastener driver 100 is empty of any fasteners.

Although the disclosure has been described in detail with reference to certain preferred embodiments, variations and modifications exist within the scope and spirit of one or more independent aspects of the disclosure as described.

Various features of the invention are set forth in the following claims.

What is claimed is:

1. A powered fastener driver comprising:

a housing;

a nosepiece extending from the housing;

a workpiece contact bracket slidably disposed on the nosepiece;

a driver blade movable within the nosepiece between a top-dead-center (TDC) position and a bottom-dead-center (BDC) position;

a piston coupled to the driver blade for movement therewith;

a driver cylinder within which the piston is movable and in fluid communication with a pressurized gas acting on the piston;

a magazine coupled to the nosepiece in which collated fasteners are receivable;

a fastener delivery mechanism coupled to the nosepiece for individually transferring collated fasteners in the magazine to a fastener driving channel in the nosepiece;

a nosepiece access door pivotably disposed on the nosepiece to provide access to the fastener driving channel; and a dry-fire lockout lever pivotably disposed on the nosepiece access door adjacent the fastener driving channel, wherein the dry-fire lockout lever is movable between a first bypass position in which movement of the workpiece contact bracket is not obstructed and in which the dry-fire lockout lever is engaged with a first fastener adjacent the fastener driving channel, a second bypass position in which movement of the workpiece contact bracket is not obstructed and in which the dry-fire lockout lever is engaged with a second fastener within the fastener driving channel, and a lockout position in which movement of the workpiece contact bracket is obstructed, wherein the dry-fire lockout lever is entirely removed from the fastener driving channel when in the first bypass position, and wherein the dry-fire lockout lever is at least partially positioned within the fastener driving channel when in the second bypass position.

2. The powered fastener driver of claim 1, wherein in the lockout position the dry-fire lockout lever prevents the workpiece contact bracket from sliding on the nosepiece.

3. The powered fastener driver of claim 2, wherein in the second bypass position, the driver blade contacts a portion of the dry-fire lockout lever as it moves to the BDC position.

4. The powered fastener driver of claim 1, wherein in the first bypass position, the driver blade does not contact the dry-fire lockout lever as it moves to the BDC position.

5. The powered fastener driver of claim 1, wherein the dry-fire lockout lever includes at least one link connecting the dry-fire lockout lever to the nosepiece access door and the dry-fire lockout lever pivots on the at least one link.

6. The powered fastener driver of claim 5, wherein the at least one link is contacted by the first fastener adjacent the fastener driving channel to move the dry-fire lockout lever into a position clear of the driver blade.

7. A powered fastener driver comprising:

a housing;

a nosepiece extending from the housing;

a workpiece contact bracket slidably disposed on the nosepiece;

a driver blade movable within the nosepiece between a top-dead-center (TDC) position and a bottom-dead-center (BDC) position;

a piston coupled to the driver blade for movement therewith;

a driver cylinder within which the piston is movable and in fluid communication with a pressurized gas acting on the piston;

a magazine coupled to the nosepiece in which collated fasteners are receivable;

a fastener delivery mechanism coupled to the nosepiece for individually transferring collated fasteners in the magazine to a fastener driving channel in the nosepiece;

a nosepiece access door pivotably disposed on the nosepiece to provide access to the fastener driving channel; and a dry-fire lockout lever pivotably disposed on the nosepiece access door adjacent the fastener driving channel, wherein the dry-fire lockout lever includes a first bypass position in which a queued fastener adjacent the fastener driving channel engages the dry-fire lockout lever to prevent the dry-fire lockout lever from entering the fastener driving channel and the driver blade from contacting the dry-fire lockout lever as the driver blade moves toward the BDC position.

8. The powered fastener driver of claim 7, wherein the dry-fire lockout lever includes at least one link connecting the dry-fire lockout lever to the nosepiece access door.

9. The powered fastener driver of claim 8, wherein the at least one link is contacted by the queued fastener to move the dry-fire lockout lever into a position clear of the driver blade.

10. The powered fastener driver of claim 7, wherein in the first bypass position, movement of the workpiece contact bracket is not obstructed.

11. The powered fastener driver of claim 10, wherein the dry-fire lockout lever includes a second bypass position in which movement of the workpiece contact bracket is not obstructed and the dry-fire lockout lever extends at least partially into the fastener driving channel.

12. The powered fastener driver of claim 11, wherein in the second bypass position, the dry-fire lockout lever engages a loaded fastener within the fastener driving channel.

13. The powered fastener driver of claim 11, wherein the dry-fire lockout lever further includes a lockout position in which movement of the workpiece contact bracket is obstructed.

14. The powered fastener driver of claim 13, wherein in the lockout position, the powered fastener driver is empty of fasteners.

15. A powered fastener driver comprising:

a housing;

a nosepiece extending from the housing;

a workpiece contact bracket slidably disposed on the nosepiece;

a driver blade movable within the nosepiece between a top-dead-center (TDC) position and a bottom-dead-center (BDC) position;

a piston coupled to the driver blade for movement therewith;

a driver cylinder within which the piston is movable and in fluid communication with a pressurized gas acting on the piston;

a magazine coupled to the nosepiece in which collated fasteners are receivable;

a fastener delivery mechanism coupled to the nosepiece for individually transferring collated fasteners in the magazine to a fastener driving channel in the nosepiece;

a nosepiece access door pivotably disposed on the nosepiece to provide access to the fastener driving channel; and a dry-fire lockout lever pivotably disposed on the nosepiece access door adjacent the fastener driving channel, wherein the workpiece contact bracket engages the dry-fire lockout lever in response to upward movement of the workpiece contact bracket relative to the nosepiece to maintain the dry-fire lockout lever in a first bypass position, in which the dry-fire lockout lever is prevented from entering the fastener driving channel to be contacted by the driver blade as it moves toward the BDC position.

16. The powered fastener driver of claim 15, wherein the workpiece contact bracket includes a cam portion that engages the dry-fire lockout lever as the workpiece contact bracket moves along the nosepiece.

17. The powered fastener driver of claim 16, wherein the cam portion rotates the dry-fire lockout lever into a position clear of the driver blade.

18. The powered fastener driver of claim 15, wherein the dry-fire lockout lever includes a second bypass position in which movement of the workpiece contact bracket is not obstructed and the dry-fire lockout lever extends at least partially into the fastener driving channel.

19. The powered fastener driver of claim 18, wherein in the second bypass position, the dry-fire lockout lever is engaged with a loaded fastener disposed within the fastener driving channel.

20. The powered fastener driver of claim 19, wherein the dry-fire lockout lever further includes a lockout position in which movement of the workpiece contact bracket is obstructed and the powered fastener driver is empty of any fasteners.

* * * * *